US012270893B2

(12) United States Patent
Nicolls et al.

(10) Patent No.: US 12,270,893 B2
(45) Date of Patent: Apr. 8, 2025

(54) CALIBRATING RADARS AND TRACKING SPACE OBJECTS

(71) Applicant: LeoLabs, Inc., Menlo Park, CA (US)

(72) Inventors: Michael Nicolls, Portola Valley, CA (US); John Buonocore, Redwood City, CA (US); Christopher Rosner, Redwood City, CA (US); Matthew Adelman, Palo Alto, CA (US); Matthew Stevenson, San Jose, CA (US)

(73) Assignee: LeoLabs, Inc., Menlo Park, CA (US)

( * ) Notice: Subject to any disclaimer, the term of this patent is extended or adjusted under 35 U.S.C. 154(b) by 322 days.

(21) Appl. No.: 17/767,147

(22) PCT Filed: Oct. 11, 2020

(86) PCT No.: PCT/US2020/055179
§ 371 (c)(1),
(2) Date: Apr. 7, 2022

(87) PCT Pub. No.: WO2021/072348
PCT Pub. Date: Apr. 15, 2021

(65) Prior Publication Data
US 2022/0376389 A1 Nov. 24, 2022

Related U.S. Application Data

(60) Provisional application No. 62/914,304, filed on Oct. 11, 2019.

(51) Int. Cl.
G01S 13/72 (2006.01)
G01S 7/40 (2006.01)
(Continued)

(52) U.S. Cl.
CPC ............... G01S 13/72 (2013.01); G01S 7/40 (2013.01); G01S 13/06 (2013.01); H01Q 3/267 (2013.01);
(Continued)

(58) Field of Classification Search
CPC . G01S 13/72; G01S 7/40; G01S 13/06; G01S 2013/0245; H01Q 3/267; H01Q 3/30; H01Q 19/175
See application file for complete search history.

(56) References Cited

U.S. PATENT DOCUMENTS

2008/0150793 A1* 6/2008 Bast ...................... G01S 13/882
342/174
2013/0079060 A1* 3/2013 Pivit ...................... H01Q 3/267
455/561
2019/0235003 A1* 8/2019 Paulsen .................. G01R 29/10

FOREIGN PATENT DOCUMENTS

EP 1394563 3/2004
JP 2000131429 5/2000
(Continued)

OTHER PUBLICATIONS

International Search Report and Written Opinion dated Jan. 18, 2021 for International Application PCT/US2020/055179 filed Oct. 11, 2020 (13 pages).
(Continued)

Primary Examiner — Peter M Bythrow
Assistant Examiner — Nazra Nur Waheed
(74) Attorney, Agent, or Firm — Dentons US LLP

(57) ABSTRACT

Some of such technologies enable a technique for calibrating a radar based on using—A—an elemental antenna, which can be embedded on a housing hosting a set of antenna elements, or—B—an antenna mounted to a reflector (108). Some of such technologies enable a radar site containing a first ID phased array (112) and a second ID phased array (112), where the first ID phased array sends a set of signals and receives a set of reflections based on the set of signals, and the second ID phased array receives the set of reflections.

10 Claims, 40 Drawing Sheets

(51) Int. Cl.
    *G01S 13/06*     (2006.01)
    *H01Q 3/26*     (2006.01)
    *H01Q 3/30*     (2006.01)
    *H01Q 19/17*     (2006.01)
    *G01S 13/02*     (2006.01)

(52) U.S. Cl.
    CPC ............ *H01Q 3/30* (2013.01); *H01Q 19/175* (2013.01); *G01S 2013/0245* (2013.01)

(56) References Cited

FOREIGN PATENT DOCUMENTS

| | | |
|---|---|---|
| JP | 2006325033 | 11/2006 |
| JP | 2015154487 | 8/2015 |

OTHER PUBLICATIONS

Van Werkhoven et al., Calibration aspects of the APAR antenna Unit, Phased Array System and Technology, IEEE, 2000, pp. 425-428.

Wilden et al., GESTRA—A Phased-Array based surveillance and tracking Radar for Space Situational Awareness, IEEE, 2016 (5 pages).

* cited by examiner

FIG. 6
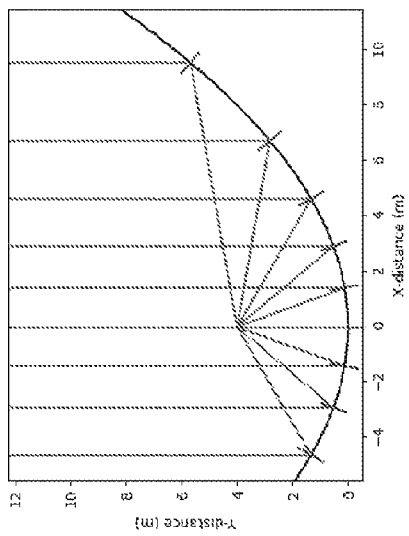
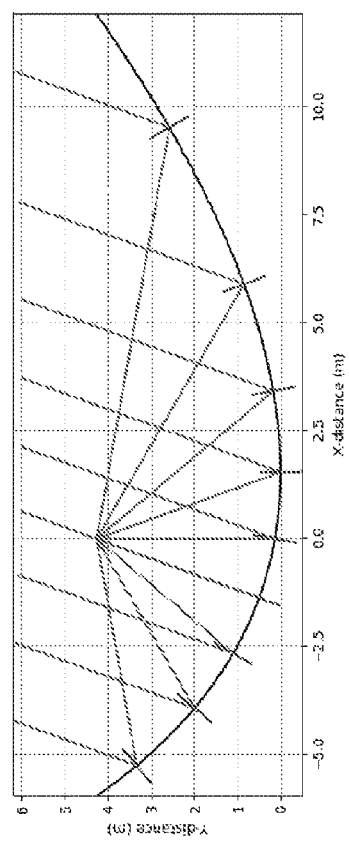
Reflective pattern 200

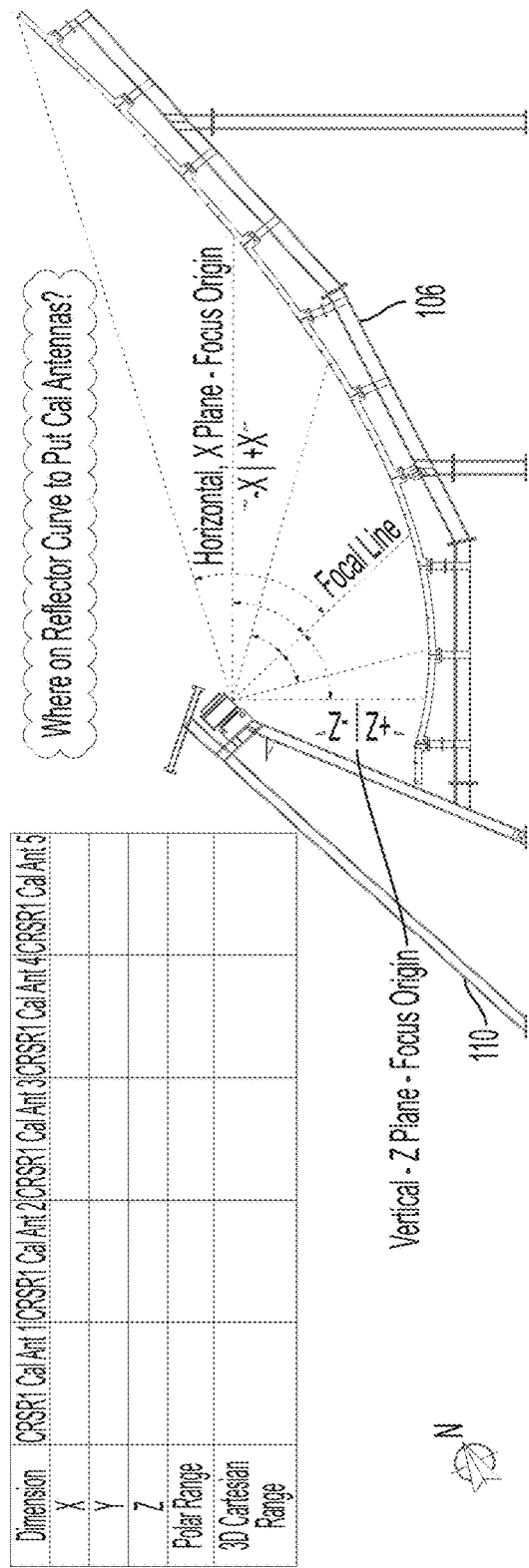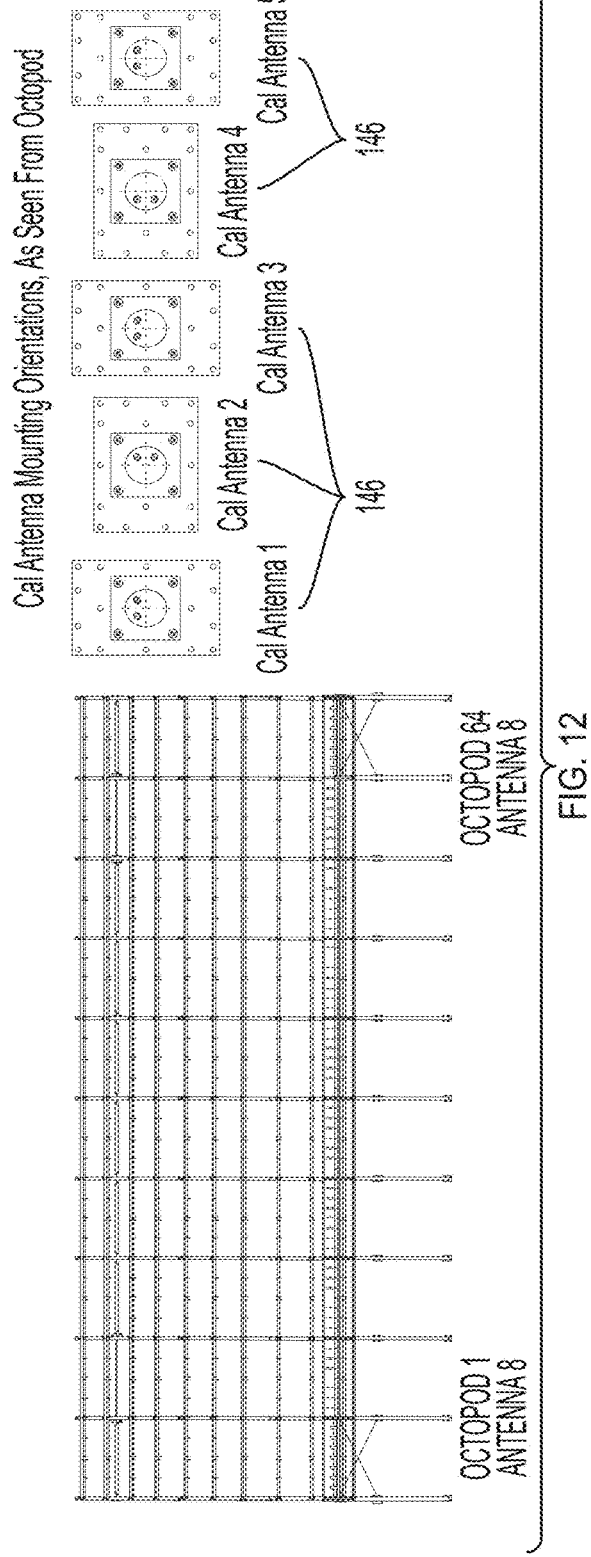
FIG. 12

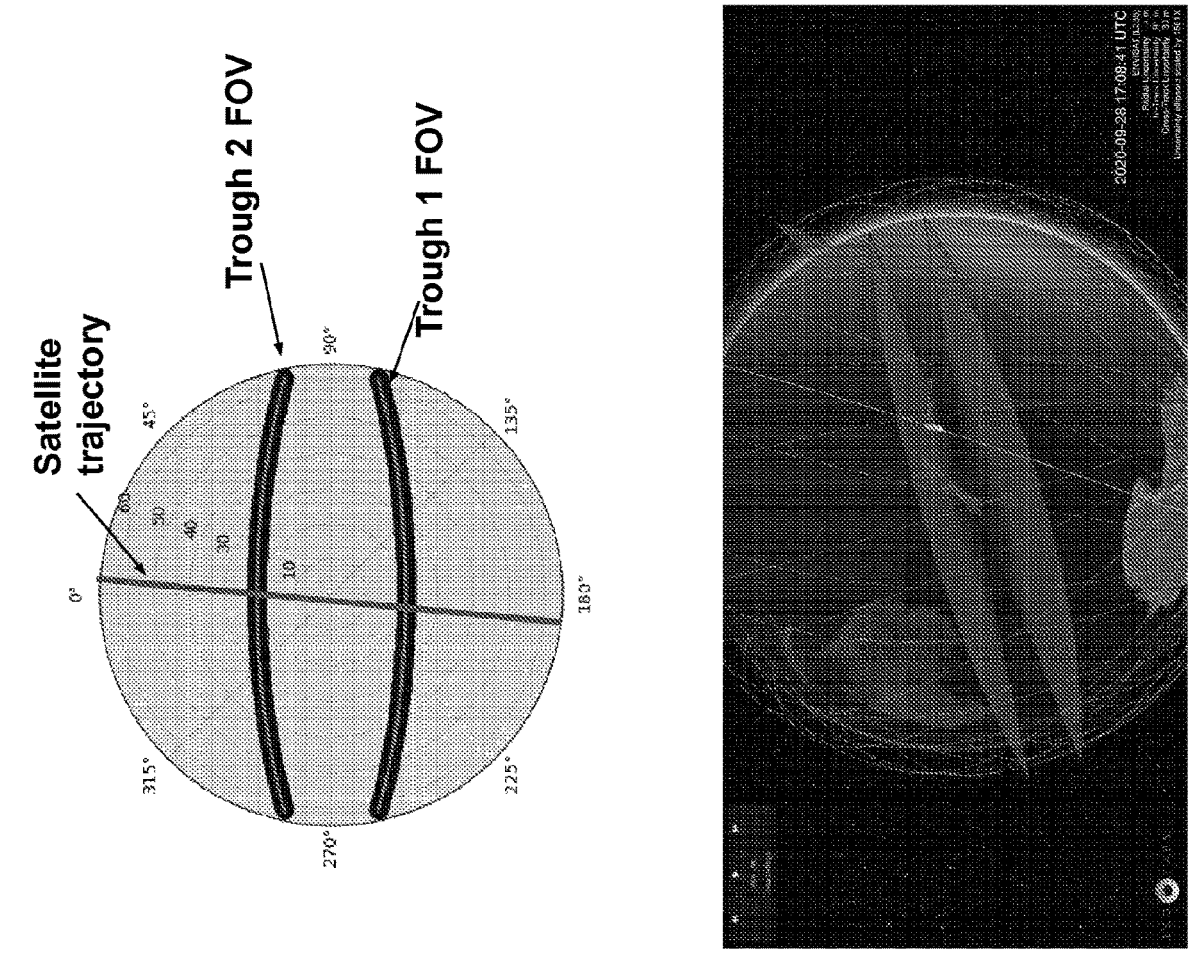
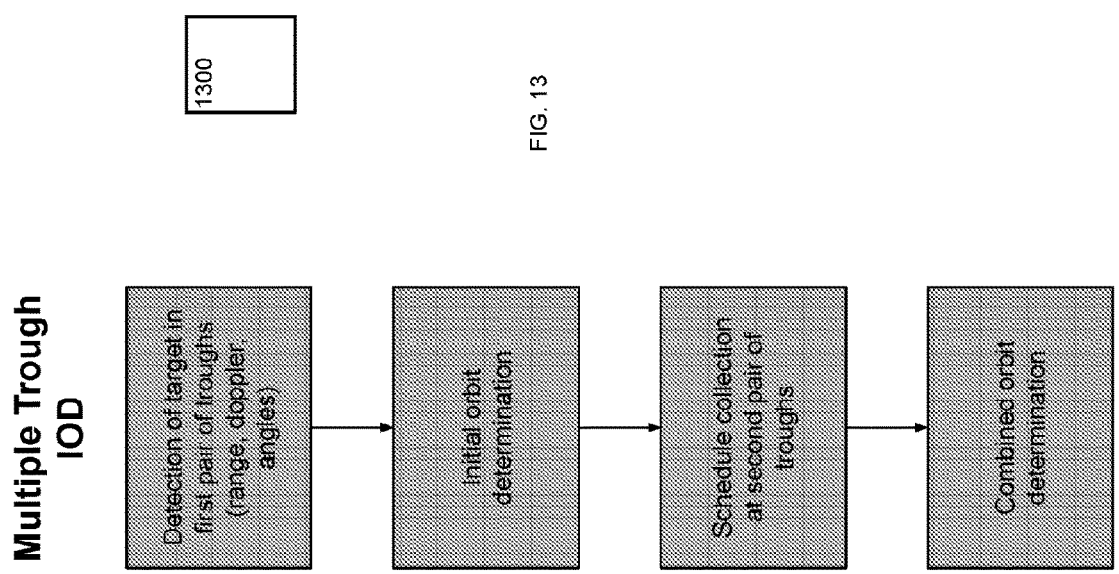
FIG. 13

Overview

1. Initial Orbit Determination (IOD)
   1) determine an orbit with no a priori information,
   2) depends only on measurements, 2. When is the algorithm required?
   1) determine orbits for unknown (uncatalogued) objects,
   2) reinitialize orbits for known objects with no measurements for a while

FIG. 14

Initial Orbit Determination Procedure

FIG. 16

IOD Procedure

1. Get tracklets from both troughs,

IOD Procedure

1. Get tracklets from both troughs.
2. Select the best candidate from each tracklet (dynamical meas. fitter),

IOD Procedure

1. Get tracklets from both troughs,
2. Select the best candidate from each tracklet (dynamical meas. fitter),
3. Guess an initial orbit,

IOD Procedure

1. Get tracklets from both troughs,
2. Select the best candidate from each tracklet (dynamical meas. filter),
3. Guess an initial orbit,
4. Minimize cost function with regularized Batch LSQ Software Architecture

Software Architecture

1. The IOD algorithm consists of two python scripts, written only for IOD, and frame_conversion.py in the backend,
   1) "*test_leolabs_iod.py*" : file path, basic setting, I/O, function calls,
   2) "*leolabs_iod_utils.py*" :
      a) Time format conversion,
      b) Orbit expression conversion,
      c) Cost function minimization,
      d) Residual calculation,
      e) Etc.

2. KSR measurements from the API measurements json
   1) "*arrange_api_measurements_for_ksr_iod.py*"

FIG. 22

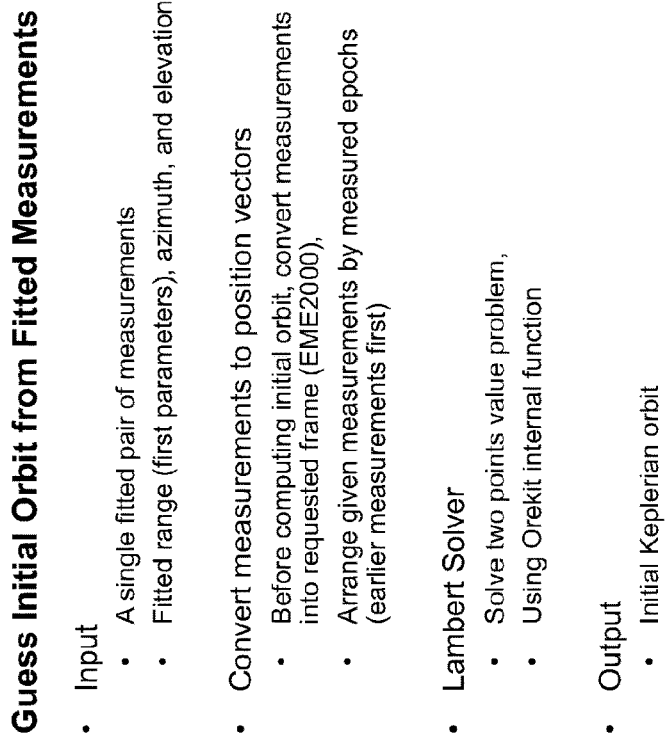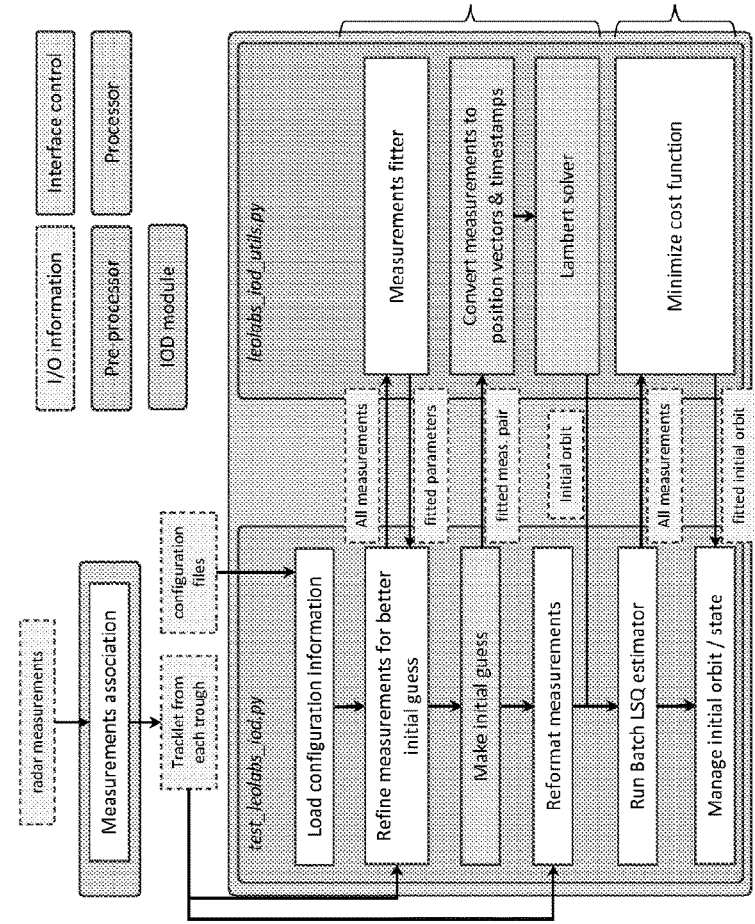
FIG. 27

CALIBRATING RADARS AND TRACKING SPACE OBJECTS

CROSS-REFERENCE TO RELATED PATENT APPLICATIONS

This patent application claims a benefit of PCT International Application PCT/US2020/055179 filed 11 Oct. 2020; which claims a benefit of U.S. Provisional Patent Application 62/914,304 filed 11 Oct. 2019; which is herein fully incorporated by reference for all purposes.

TECHNICAL FIELD

This disclosure relates to calibrating radars and tracking space objects.

BACKGROUND

There are various ways to track various space objects (e.g., low earth objects, satellites, debris). For example, some space objects can be tracked via 2D phased array radars. However, these systems are technologically disadvantageous because of large size, technological complexity, and high financial costs. Some of such technological disadvantages can be overcome by steerable dish radars. However, these systems are technologically disadvantageous because of low tracking rates, mechanical steering, and limited beaming abilities.

SUMMARY

Generally, this disclosure enables various technologies for calibrating radars and tracking space objects. For example, some of such technologies enable a technique for calibrating a radar based on using (a) an elemental antenna, which can be embedded on a housing hosting a set of antenna elements, or (b) an antenna mounted to a reflector. For example, some of such technologies enable a radar site containing a first 1D phased array and a second 1D phased array, where the first 1D phased array sends a set of signals and receives a set of reflections based on the set of signals, and the second 1D phased array receives the set of reflections.

In accordance with an exemplary embodiment involving radar calibration, calibration can be achieved by transmitting a signal from each of a plurality of phased array antennas and measuring a transmission phase for each transmitted signal as received at each of one or more calibration antennas, where one transmission phase is measured for each phased array antenna-calibration antenna combination. The embodiment further involves receiving, from each of the one or more calibration antennas, a signal at each of the plurality of phased array antennas, and measuring a receive phase for each received signal at each of the plurality of phased array antennas; again, one receive phase is measured for each phased array antenna-calibration antenna combination. Then, each measured transmission phase and each measured receive phase is adjusted by a phase offset associated with a corresponding one of the one or more calibration antennas, where the phase offset for each one of the one or more calibration antennas is greater than or equal to zero. A single transmission phase correction can then be calculated for each of the plurality of phased array antennas, where the single transmission phase correction for a given one of the phased array antennas is based on a weighted average of the offset adjusted, measured transmission phases associated with the given one of the phased array antennas and the one or more calibration antennas. Similarly, a single receive phase correction can be calculated for each of the plurality of phased array antennas, where the single receive phase correction for a given one of the phased array antennas is based on a weighted average of the offset adjusted, measured receive phases associated with the given one of the phased array antennas and the one or more calibration antennas. The single transmission phase correction for each of the plurality of phased array antennas and the single receive phase correction for each of the plurality of phased array antennas are then stored for use in adjusting the phase of the plurality of phased array antennas during radar operations.

In accordance with another exemplary embodiment involving radar calibration, calibration can be achieved by transmitting, for each of a plurality of radar assemblies, each comprising a first antenna and a plurality of phased array antennas, a signal from the first antenna to each of a plurality of phased array antennas, and measuring a receive phase of the signal as received at each of the plurality of phased array antennas, and also receiving at the first antenna a signal transmitted from each of the plurality of phased array antennas, and measuring a transmit phase for each signal transmitted by the plurality of phased array antennas as received at the first antenna. A transmit channel phase correction can then be calculated for each of the plurality of phased array antennas based on the corresponding transmit phase measurement of each of the plurality of phased array antennas adjusted by a loop back phase value correspond to the radar assembly in which each individual phased array antenna is located. A receive channel phase correction can also be calculated for each of the plurality of phased array antennas based on the corresponding receive phase measurement of each of the plurality of phased array antennas, adjusted by the loop back phase value correspond to the radar assembly in which each individual phased array antenna is located. The plurality of phased array antennas can then be calibrated during radar operations based on the transmit and receive channel phase corrections.

In still another embodiment, the plurality of phased array antennas can be further calibrated during radar operations based on the transmit and receive channel phase corrections as well as an inter-radar assembly transmit phase offset and inter-radar assembly receive phase offset. This can be achieved by calculating an inter-radar assembly transmit phase offset for each of the plurality of radar assemblies and an inter-radar assembly receive phase offset for each of the plurality of radar assemblies. An internal transmit phase offset can then be calculated for each of the plurality of phased array antennas by adjusting the transmit channel phase correction of each of the plurality of phased array antennas by the inter-radar assembly transmit phase offset calculated for the corresponding radar assembly in which each of the plurality of phased array antennas is located. Similarly, an internal receive phase offset can be calculated for each of the plurality of phased array antennas by adjusting the receive channel phase correction of each of the plurality of phased array antennas by the inter-radar assembly receive phase offset calculated for the corresponding radar assembly in which each of the plurality of phased array antennas is located. The internal transmit phase offset for each of the plurality of phased array antennas and the internal receive phase offset for each of the plurality of phased array antennas can then be stored, and the phased array antennas can be calibrated during radar operations, based on a corresponding internal transmit phase offset and the total internal receive phase offset.

DESCRIPTION OF DRAWINGS

FIGS. 2-7 show a plurality of diagrams of the radar site according to this disclosure.

FIG. 12 shows an embodiment of a frame supporting a 1D phased array over a trough reflector according to this disclosure.

FIG. 13 shows an embodiment of a process for determining an initial orbit determination in light of a pair of diagrams indicating a trajectory of a satellite intersecting a first field of view and a second field of view according to this disclosure.

FIGS. 14-31 show an embodiment of a process for determining an initial orbit determination and a software architecture therefor according to this disclosure.

DETAILED DESCRIPTION

Figure 1:
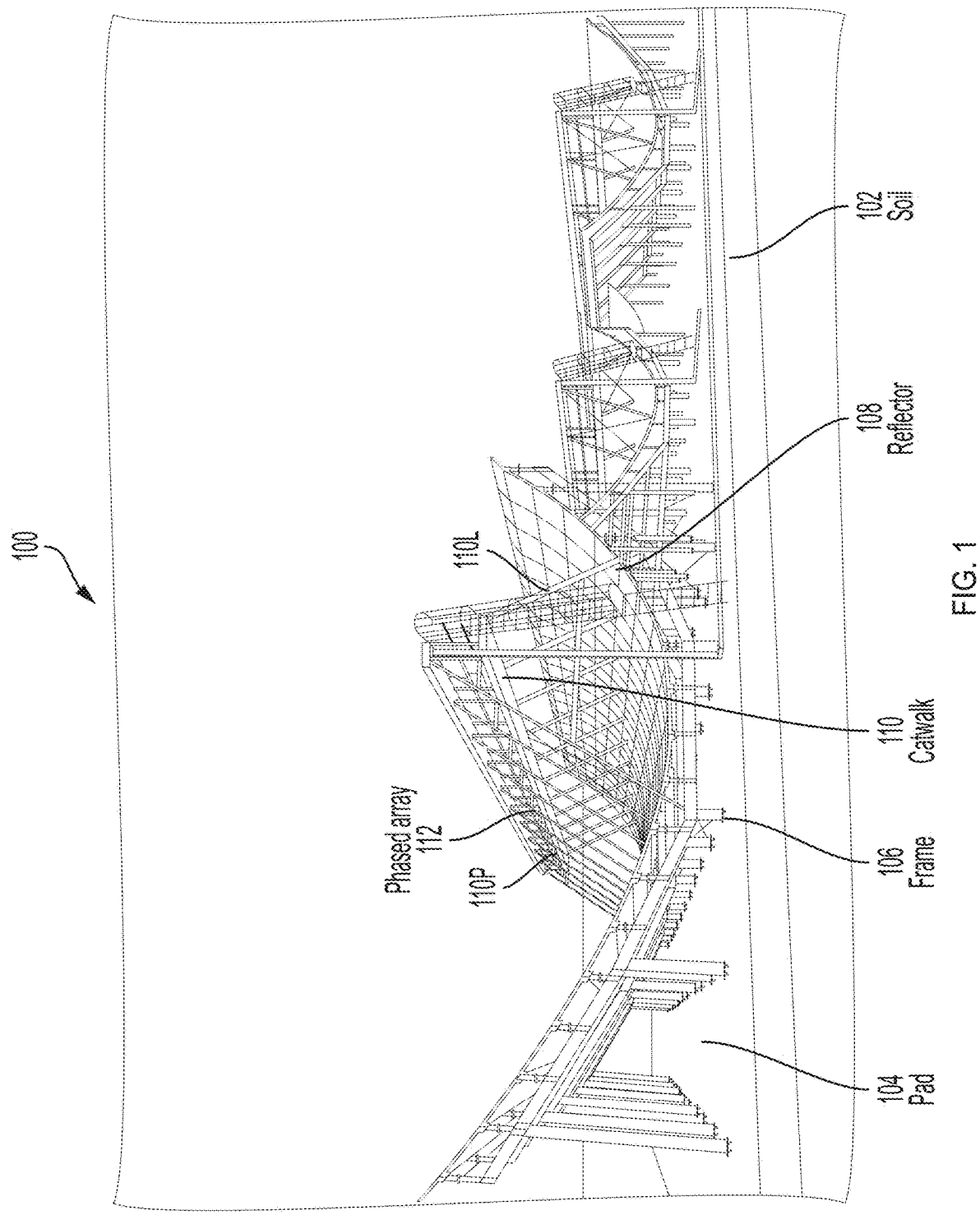
FIG. 1 shows an embodiment of a radar site according to this disclosure.

Generally, this disclosure enables various technologies for calibrating radars and tracking space objects. For example, some of such technologies enable a technique for calibrating a radar based on using (a) an elemental antenna, which can be embedded on a housing hosting a set of antenna elements, or (b) an antenna mounted to a reflector. For example, some of such technologies enable a radar site containing a first 1D phased array and a second 1D phased array, where the first 1D phased array sends a set of signals and receives a set of reflections based on the set of signals, and the second 1D phased array receives the set of reflections. This disclosure is now described more fully with reference to 1-39, in which various embodiments of this disclosure are shown. This disclosure can be embodied in many different forms and should not be construed as necessarily being limited to the embodiments disclosed herein. Rather, the embodiments are provided so that this disclosure is thorough and complete, and fully conveys various concepts of this disclosure to those skilled in a relevant art.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, then there are no intervening elements present.

Various terminology used herein is for describing embodiments and is not intended to be necessarily limiting of this disclosure. As used herein, various singular forms "a," "an" and "the" are intended to include various plural forms as well, unless specific context clearly indicates otherwise. Various terms "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms, such as "below," "lower," "above," and "upper," can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms, such as "below" and "lower," can encompass both an orientation of above and below.

As used herein, a term "about" or "substantially" refers to a +/−10% variation from a nominal value/term. Such variation is always included in any given value/term provided herein, whether or not such variation is specifically referred thereto.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain embodiments can be combined and sub-combined in and/or with various other embodiments. Also, different aspects and/or elements of embodiments, as disclosed herein, can be combined and sub-combined in a similar manner as well. Further, some embodiments, whether individually and/or collectively, can be components of a larger system, wherein other procedures can take precedence over and/or otherwise modify their application. Additionally, a number of steps can be required before, after, and/or concurrently with embodiments, as disclosed herein. Note that any and/or all methods and/or processes, at least as disclosed herein, can be at least partially performed via at least one entity in any manner.

Embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various embodiments of this disclosure should not be construed as necessarily limited to various shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three-dimensional (3D) printing, laser cutting, computer numerical control routing, milling, pressing, stamping, vacuum forming, hydroforming, injection molding, lithography, and so forth.

Figure 7:
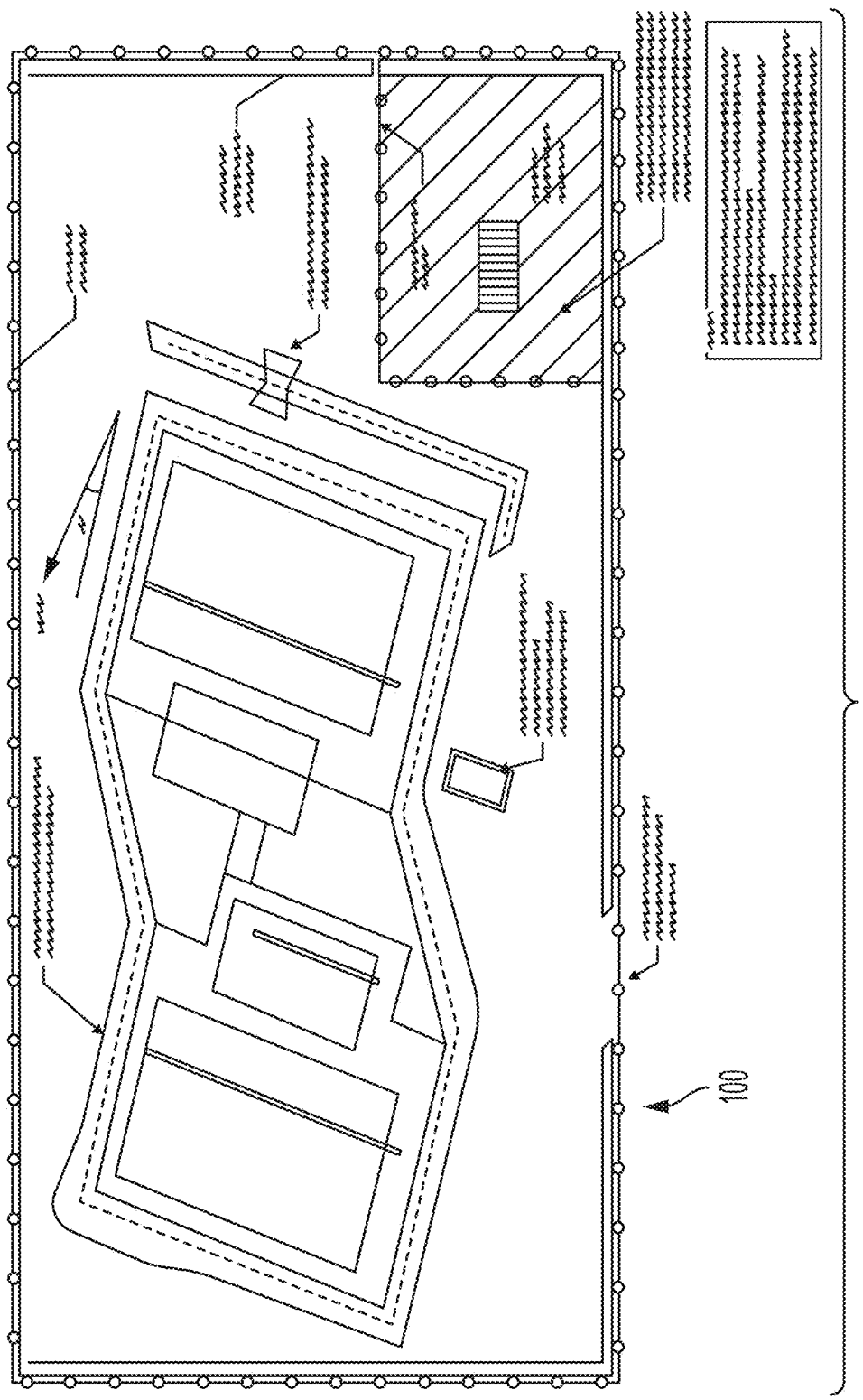
Figure 8:
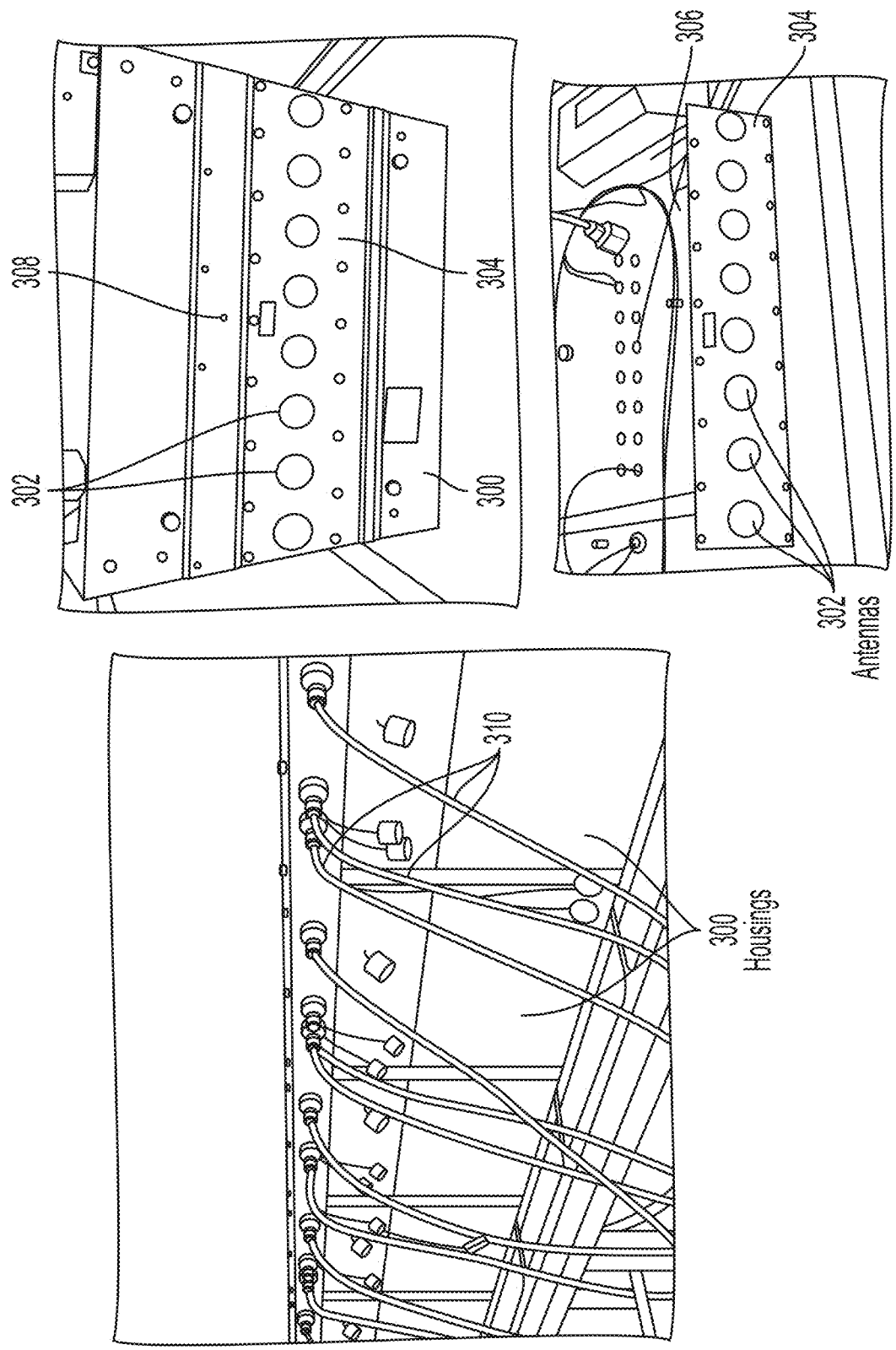
FIG. 8 shows a plurality of embodiments of a plurality of transmit or receive assemblies according to this disclosure.
Figure 9:
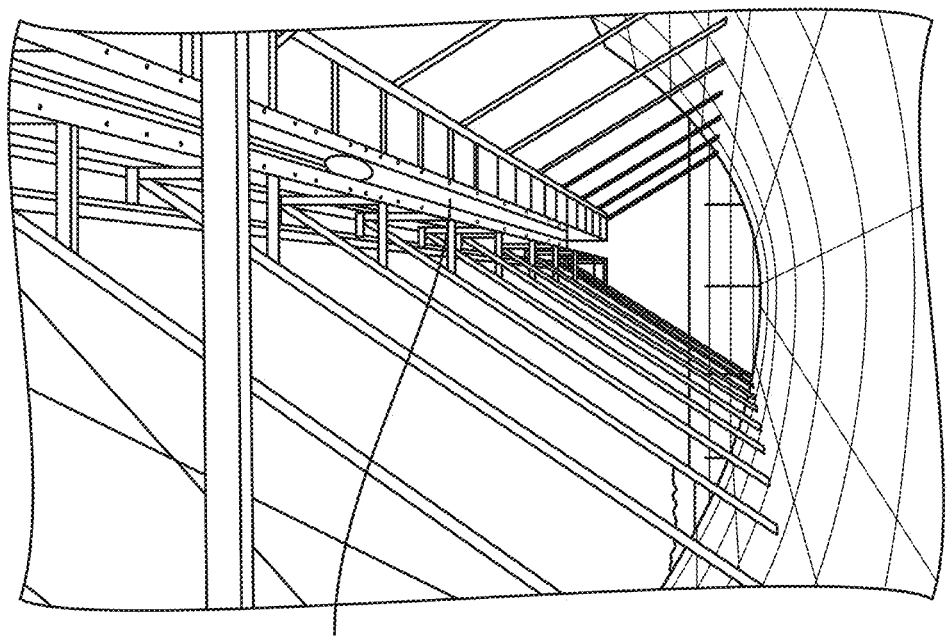
FIG. 9 shows an embodiment of a plurality of transmit or receive assemblies supported via a catwalk according to this disclosure.
Figure 10:
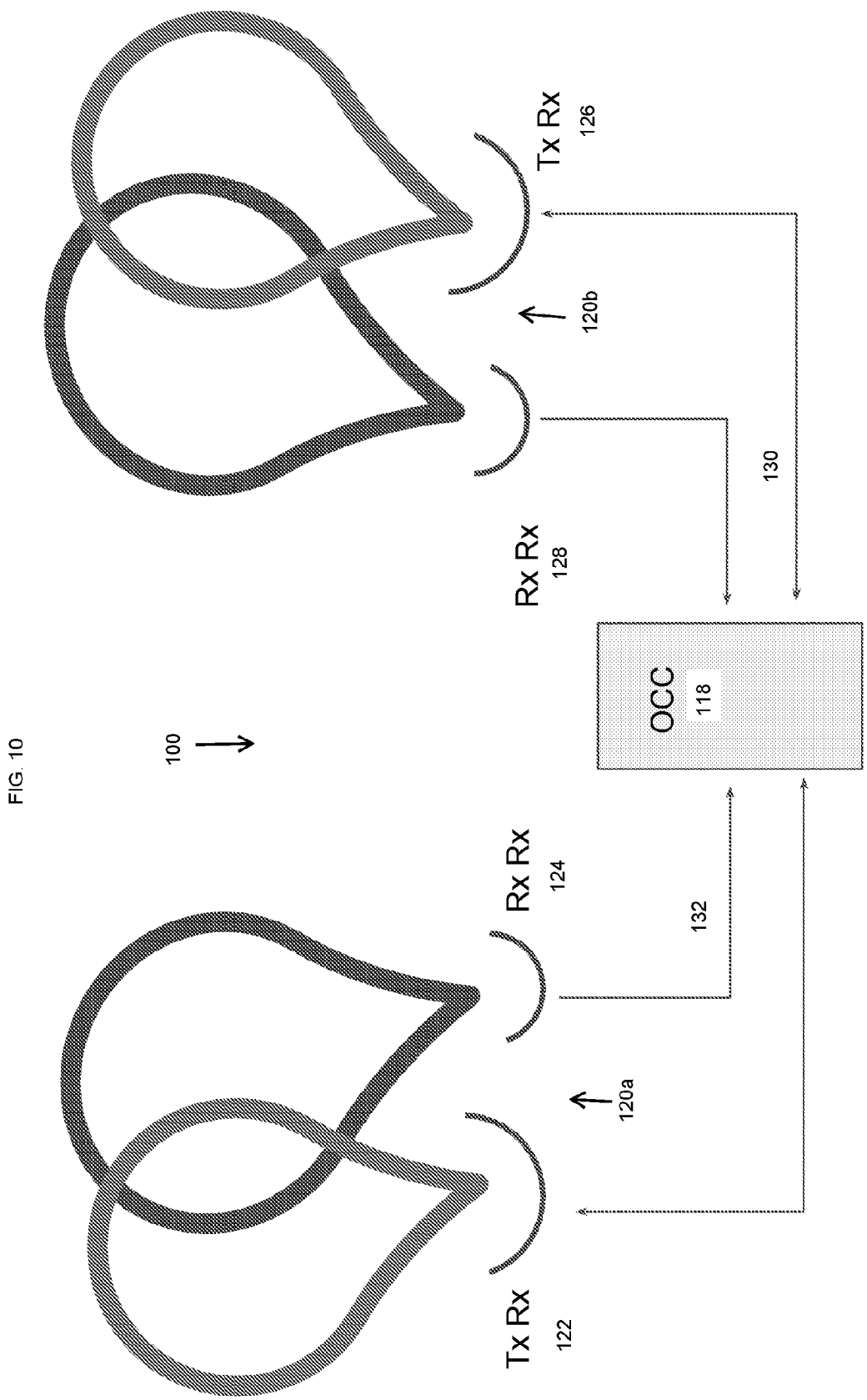
FIG. 10 shows an embodiment of a diagram of the radar site according to this disclosure.
Figure 11:
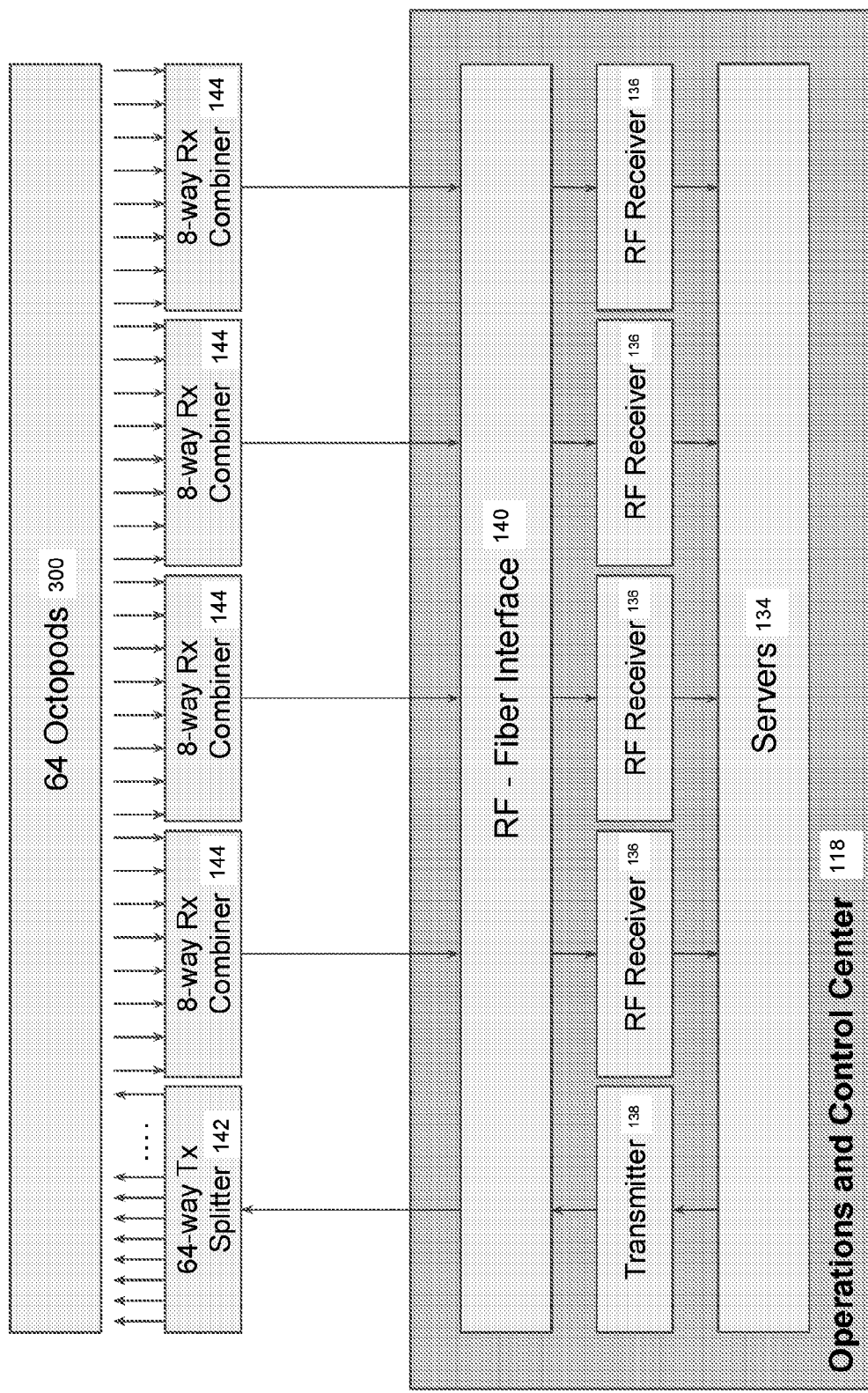
FIG. 11 shows an embodiment of a diagram of an operations and control center and a 1D phased array according to this disclosure.
Figure 15:
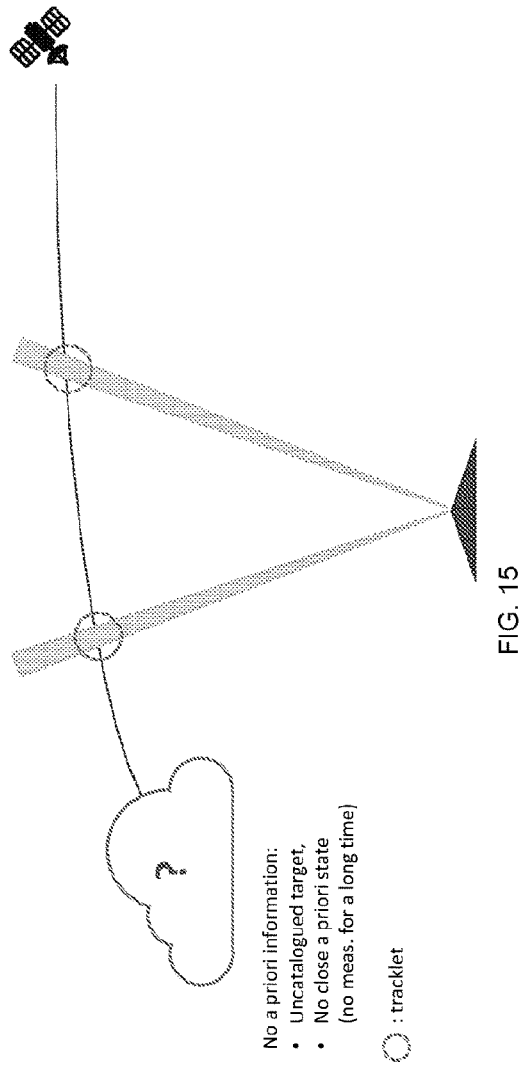
Figure 17:
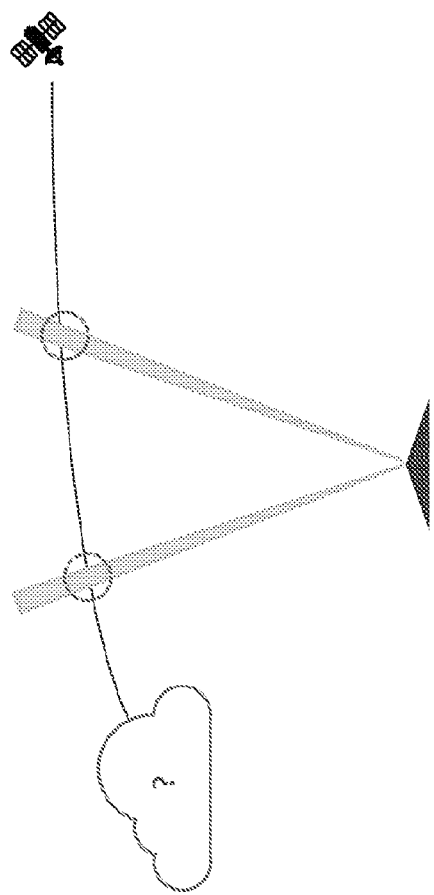
Figure 18:
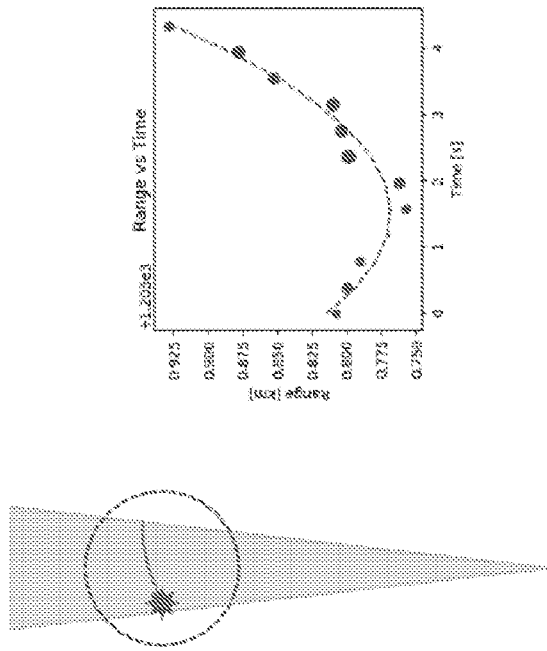
Figure 19:
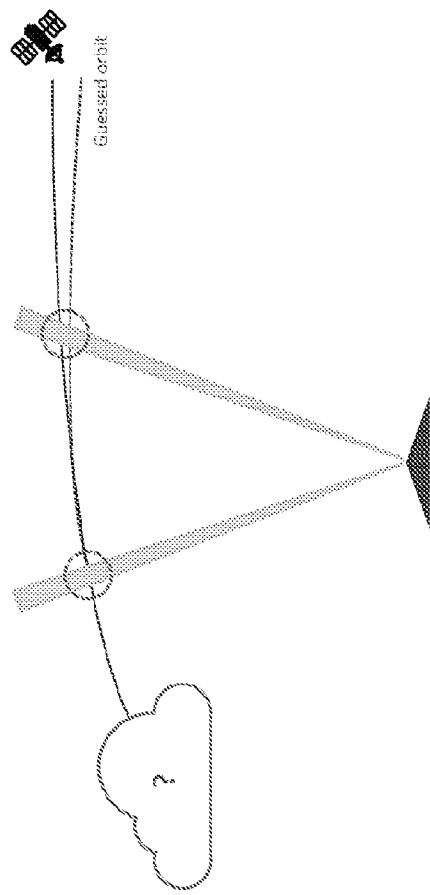
Figure 20:
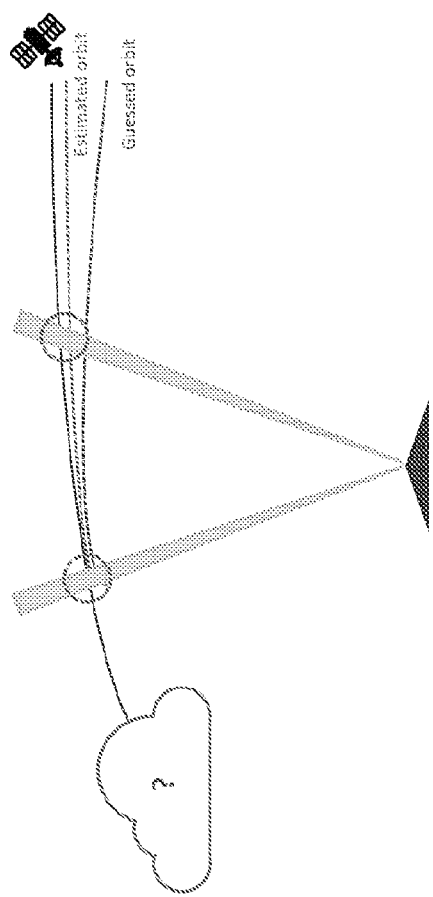
Figure 21:
Figure 32:
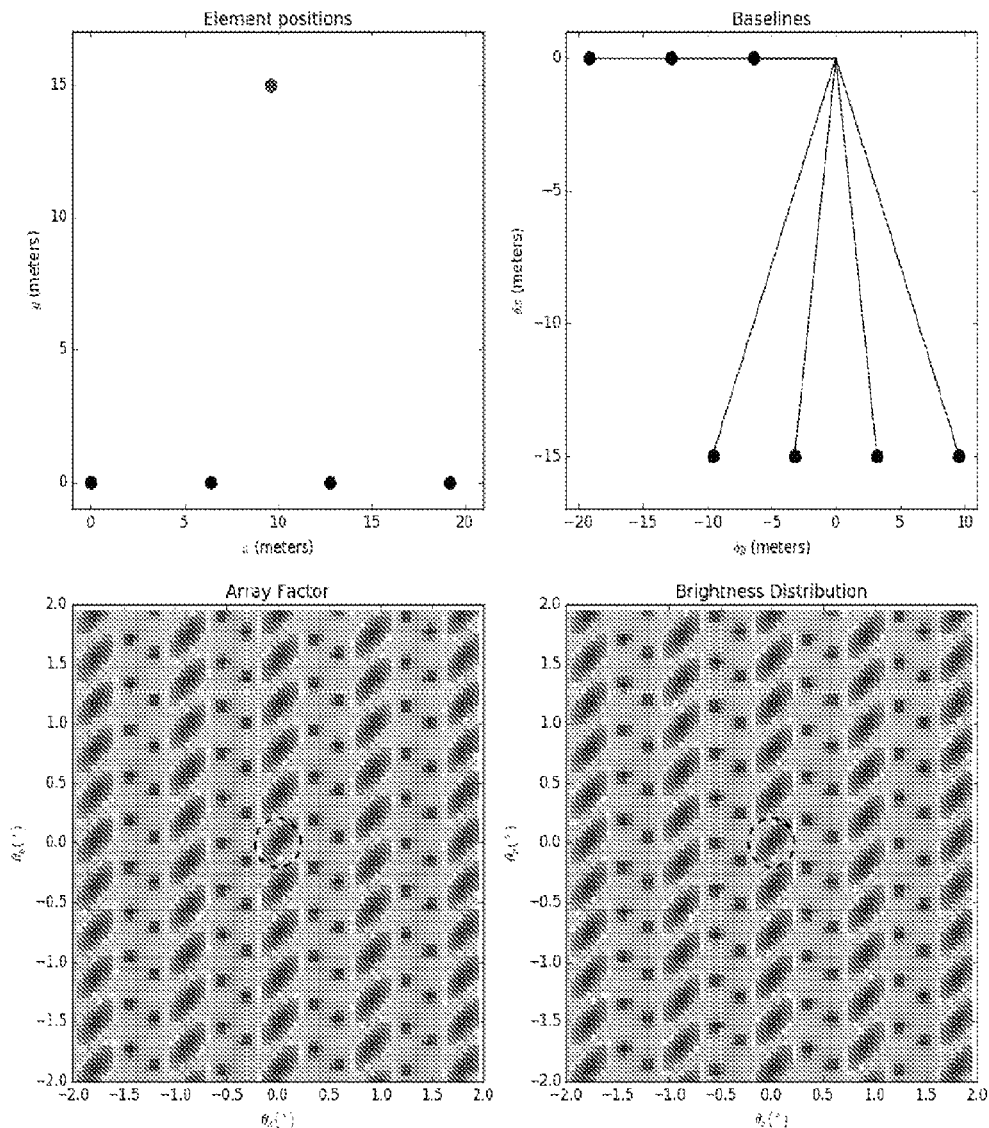
FIGS. 32-33 show an embodiment of an interferometry technique according to this disclosure.
Figure 33:
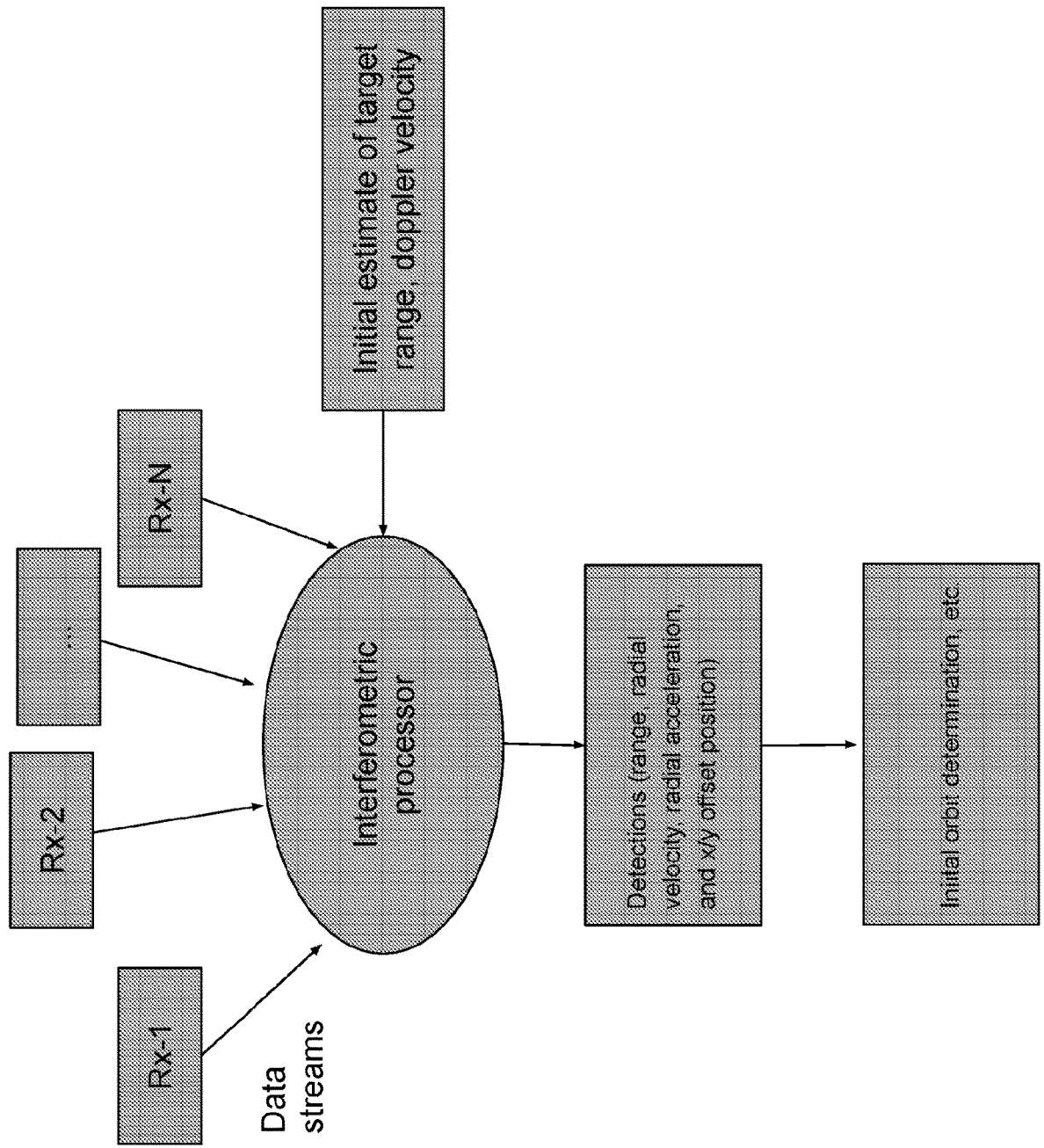

FIG. 1 shows an embodiment of a radar site according to this disclosure. FIGS. 2-7 show a plurality of diagrams of the radar site according to this disclosure. FIG. 8 shows a plurality of embodiments of a plurality of transmit or receive assemblies according to this disclosure. FIG. 9 shows an embodiment of a plurality of transmit or receive assemblies supported via a catwalk according to this disclosure. FIG. 10 shows an embodiment of a diagram of the radar site according to this disclosure. FIG. 11 shows an embodiment of a diagram of an operations and control center and a 1D phased array according to this disclosure. FIG. 12 shows an embodiment of a frame supporting a 1D phased array over a trough reflector according to this disclosure. FIG. 13 shows an embodiment of a process for determining an initial orbit determination in light of a pair of diagrams indicating a trajectory of a satellite intersecting a first field of view and a second field of view according to this disclosure. FIGS. 14-31 show an embodiment of a process for determining an initial orbit determination, a software architecture therefor, and a comparison between a result for determining an orbit of a space object using a TLE technique and a result for determining the orbit of the space object using an initial orbit determination technique according to this disclosure. FIGS. 32-33 show an embodiment of an interferometry technique according to this disclosure.

Figure 2:
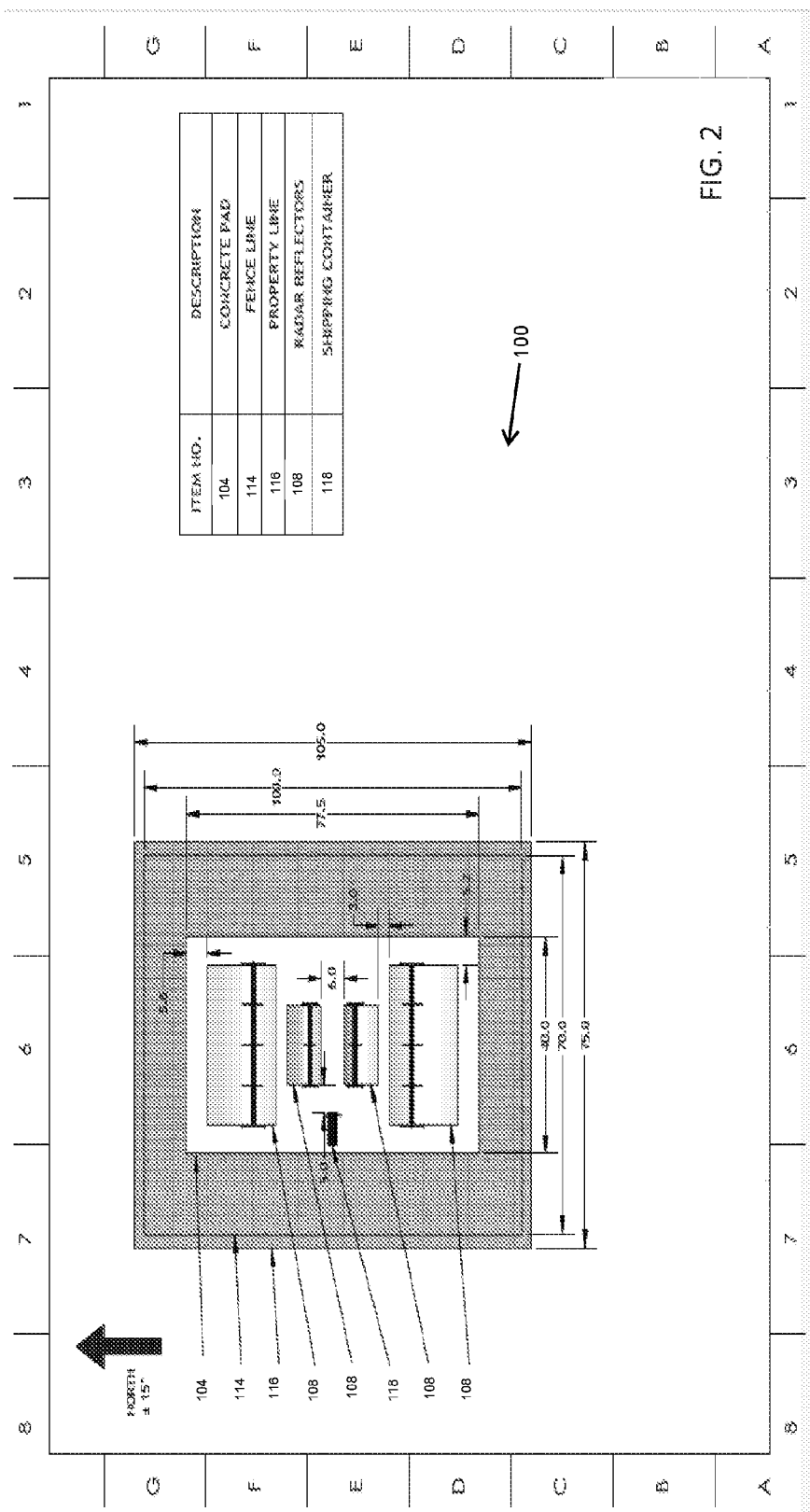

A defined area 100 (e.g., a radar site, an enclosed area, a fenced area) has a volume of soil 102 and a pad 104 (e.g., concrete, rubber), where the volume of soil 102 supports the pad 104. As shown in FIG. 2, the defined area 100 has a fence line 114 surrounded by a property line 116. The volume of soil 102 rests on a ground surface, although this can be omitted. The pad 104 hosts a first radar pair 120a and a second radar pair 120b.

Figure 5:
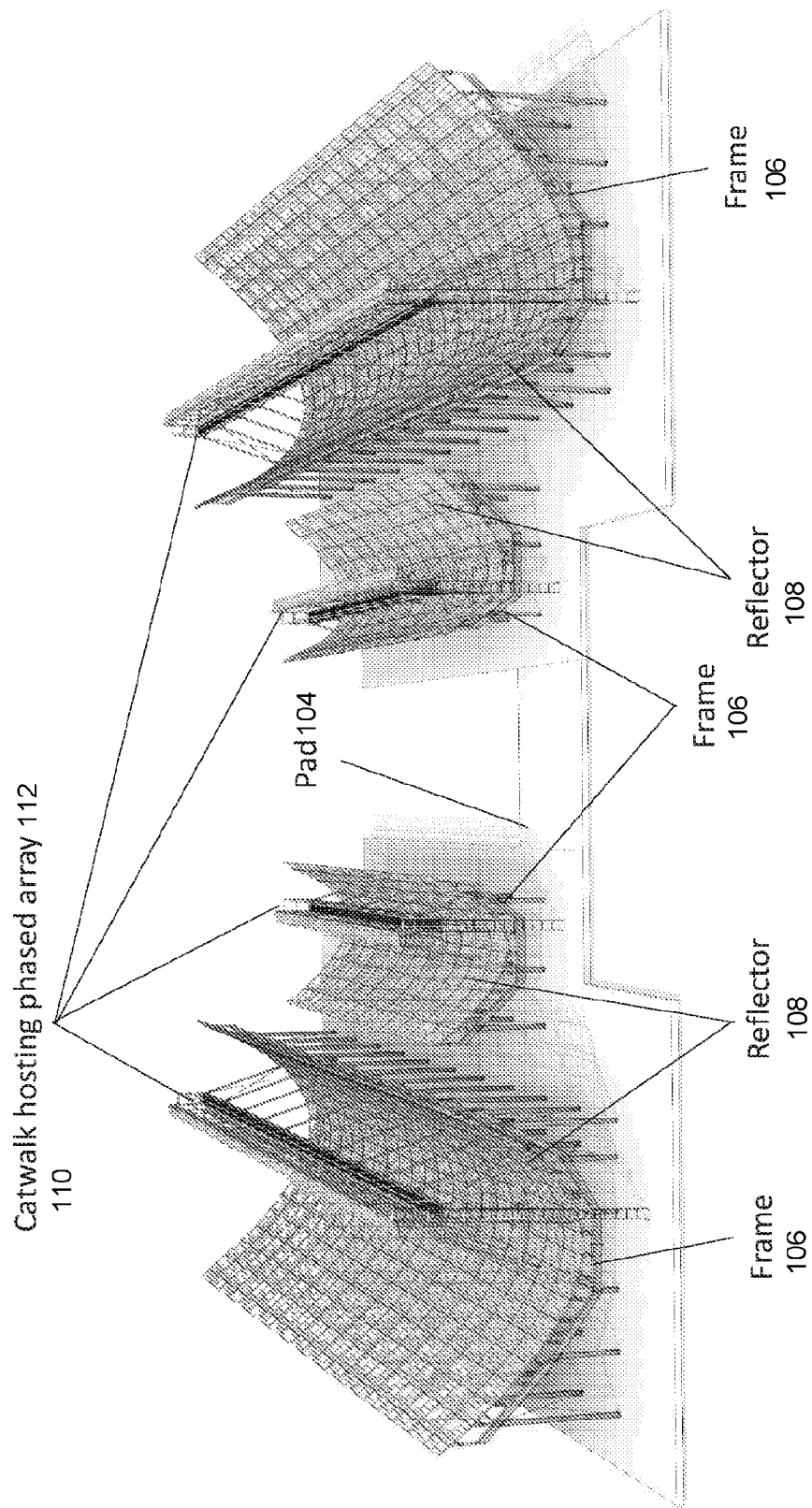

As shown in FIG. 5, the pad 104 has a first island supporting the first radar, a second island supporting the second radar, and a bridge spanning between the first island and the second island. As shown in FIG. 7, the pad 104 is arranged such that the first island and the second island are offset relative to each other (for tracking purposes). However, note that these configurations can vary. For example, the bridge can be omitted, the first island and the second island can be not offset, or the pad 104 can be omitted.

The first radar pair 120a includes a first radar having a first frame 106, a first trough reflector 108 (also called a parabolic cylinder antenna, a parabolic cylindrical antenna, or a parabolic trough antenna), a first catwalk 110, and a first 1D phased array 110. The first frame 106 (e.g., U-shape or C-shape with a set of supporting legs) is positioned within the defined area 100. The first trough reflector 108 is positioned within the defined area 100, secured (e.g., fastened) to the first frame 106, and has a first shape (e.g., U-shape, C-shape), a first longitudinal valley (e.g., extending in a Z-dimension of FIGS. 1, 4, 5), and a first scale (e.g., a size). For example, the first trough reflector 108 can by formed by a group of panels (e.g., metal, alloys, steel, mesh, grid) positioned immediately adjacent to each other to form an upper surface that is configured to reflect various signals (e.g., radio, light). For example, when at least some the panels are mesh panels having holes therein (e.g., contributes to low cost), then the holes may be sized to be smaller than an operating wavelength of the first 1D phased array 110. For example, small aperture mesh provides high reflectivity and low leakage. Signal leakage through the mesh increases antenna backlobe and system temperature. Antenna backlobe refers to radiation of energy from the antenna in the opposite direction of the main radiation direction. Increasing backlobe reduces the antenna energy radiating in the main direction. Large aperture mesh is lower cost, lighter weight, and has reduced wind loading. The mesh aperture design would consider such factors. Further, painting the mesh may protect the material from weathering. White paint reflects sunlight from the trough surface thereby minimizing thermal deformations of the structure. The materials and the methods used for constructing the trough reflector can help to lower the cost of the first radar. Note that the first trough reflector 108 can include a group of calibration antennas 146, as shown in FIG. 12. How these antennas 146 are used is further described below.

As shown in FIG. 9, the first 1D phased array 112 forms (or is arranged) in a first line. The first 1D phased array 112 is positioned, in the first line, within the defined area 100. The first 1D phased array 112 is supported (e.g., raised) by the first frame 106 over the first trough reflector 108 such that the first 1D phased array 112 sends a set of signals (e.g., radio) via the first trough reflector 108 and receives a set of reflections based on the set of signals via the first trough reflector 108. For example, as shown in FIG. 6, there can be a reflective pattern 200 where the first 1D phased array 112 can send the set of signals towards the trough reflector 108, which in turn reflects the set of signals in various directions (e.g., off a vertical). For example, the set of signals and the set of reflections can be sent and received in a V-shape (e.g., 11 o'clock, 2 o'clock). When the set of signals is reflected off a space object (e.g., a low earth object, a satellite, a piece of debris), then the set of reflections is received via the first trough reflector 108 and then reflected towards the first 1D phased array 112.

The first radar pair 120a includes a second radar having a second frame 106, a second trough reflector 108 (also called a parabolic cylinder antenna, a parabolic cylindrical antenna, or a parabolic trough antenna), a second catwalk 110, and a second 1D phased array 110. The second frame 106 is positioned within the defined area 100. The second trough reflector 108 is positioned within the defined area 100, secured (e.g., fastened) to the second frame 106, and has a second shape (e.g., U-shape, C-shape), a second longitudinal valley (e.g., extending in a Z-dimension of FIGS. 1, 4, 5), and a second scale (e.g., a size). For example, the second trough reflector 108 can by formed by a group of panels (e.g., metal, alloys, steel, mesh, grid) positioned immediately adjacent to each other to form an upper surface that is configured to reflect various signals (e.g., radio, light). For example, when at least some the panels are mesh panels having holes therein (e.g., contributes to low cost), then the holes may be sized to be smaller than an operating wavelength of the second 1D phased array 110. For example, small aperture mesh provides high reflectivity and low leakage. Signal leakage through the mesh increases antenna backlobe and system temperature. Antenna backlobe refers to radiation of energy from the antenna in the opposite direction of the main radiation direction. Increasing backlobe reduces the antenna energy radiating in the main direction. Large aperture mesh is lower cost, lighter weight, and has reduced wind loading. The mesh aperture design would consider such factors. Further, painting the mesh may protect the material from weathering. White paint reflects sunlight from the trough surface thereby minimizing thermal deformations of the structure. The materials and the methods used for constructing the trough reflector can help to lower the cost of the first radar. Note that the second trough reflector 108 can include a group of calibration antennas 146, as shown in FIG. 12. How these antennas 146 are used is further described below.

The second shape of the second trough reflector 108 is identical to the first shape of the first trough reflector 108. The second longitudinal valley of the second trough reflector 108 is parallel to the first longitudinal valley of the first trough reflector 108. However, the second scale of the second trough reflector 108 is lesser than the first scale of the first trough reflector 108 (although can be equal or greater). For example, the first trough reflector 108 and the second trough reflector 108 are identically shaped and oriented (and spaced apart from each other), but the second trough reflector 108 is a smaller version of the first trough reflector 106. Such configuration is technologically advantageous for various reasons. For example, such configuration enables an efficient (a) determination of an initial orbit for a space object, (b) determination of a range data to the space object, (c) determination of a doppler data relative to the space object, (d) an angle data relative to the space object, (e) a performance of a radar interferometry relative to the space object, and others. For example, arrays of 1D parabolic arrays 108 that can be configured to operate together to make measurements of satellites by having one or more transmit-receive arrays 108 and one or more receive-receive arrays 108 measuring polarization or perform interferometry to get 3D positions of targets.

As shown in FIG. 9, the second 1D phased array 110 forms (or is arranged) in a second line that is parallel to the first line. The second 1D phased array 110 is positioned, in the second line, within the defined area 100. The second 1D phased array 112 is supported (e.g., raised) by the second frame 106 over the second trough reflector 108 such that the second 1D phased array 110 does not send any signals via the second trough reflector 108. However, the second 1D phased array 110 receives the set of reflections based on the set of signals via the second trough reflector 108. For example, as shown in FIG. 6, there can be the reflective pattern 200 when the set of signals from the first 1D phased array is reflected off the space object (e.g., a low earth object, a satellite, a piece of debris), then the set of reflections is received via the second trough reflector 108 and then reflected towards the second 1D phased array 112. For example, the set of reflections can be received in a V-shape (e.g., 11 o'clock, 2 o'clock). Such configuration is technologically advantageous because of various reasons. For example, such configuration enables an efficient (a) determination of an initial orbit for a space object, (b) determination of a range data to the space object, (c) determination of a doppler data relative to the space object, (d) an angle data relative to the space object, (e) a performance of a radar interferometry relative to the space object, and others. For example, arrays of 1D parabolic arrays 108 that can be configured to operate together to make measurements of satellites by having one or more transmit-receive arrays 108 and one or more receive-receive arrays 108 measuring polarization or perform interferometry to get 3D positions of targets.

Note that there can be more than one (e.g., 2, 3, 4, 5, 6, 7, 8, 9, 10, tens, hundreds, thousands) of the second radars relative to the first radar (many-to-one correspondence). These second radars can be placed internal or external to the defined area 100, whether the first longitudinal valley of the first trough reflector 108 is or is not parallel to at least two of the longitudinal valleys of the second trough reflectors 108 of the second radars. How far these second radars (e.g., trough reflectors) are positioned from the first radar or each other depends on signal frequency (e.g., about 15 meters from focus). For example, the second radars can be randomly distributed within the defined area 100, although precision may increase with increasing distance between the first radar and at least two of the second radars or between at least two of the second radars.

Each of the first radar and the second radar includes a respective catwalk 110 having a first leg 110L, a second leg 110L, and a platform 110P. The first leg 110L is secured (e.g., assembled, fastened, monolithic) to a respective frame 106 within the defined area 100. The first leg 110L extends over a respective trough reflector 108. The second leg 110L is secured (e.g., assembled, fastened, monolithic) to a respective frame 106 within the defined area 100. The second leg 110L extends over a respective trough reflector 108. The platform 110P is secured (e.g., assembled, fastened, monolithic) to the first leg 110L and the second leg 1110L within the defined area 100. The platform 110P extends over a respective trough reflector 108 along a respective longitudinal valley (over or not over) and hosts a respective 1D phased array 112 (e.g., supports). The platform 110P of the first radar can extend parallel to the platform 110P of the second radar. Note that in order to physically access each respective catwalk 110, there is a respective ladder spanning between the pad 104 and the platform 110P.

As shown in FIGS. 1, 3, 4, 5, 9, the catwalk 110 can be upright A-shaped such that the platform 110P extends over a respective trough reflector 108. However, as shown in FIG.

Figure 3:
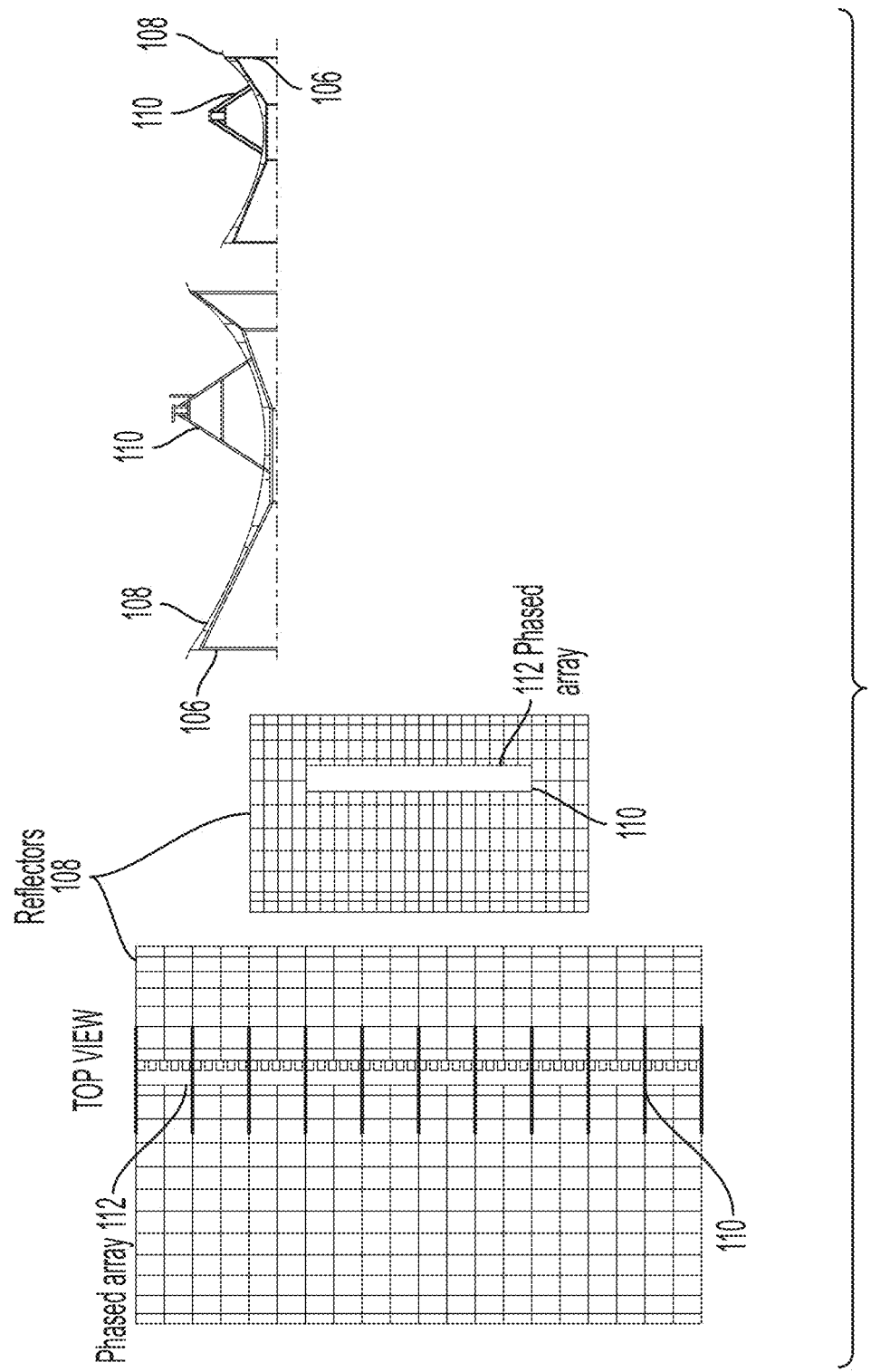
Figure 4:
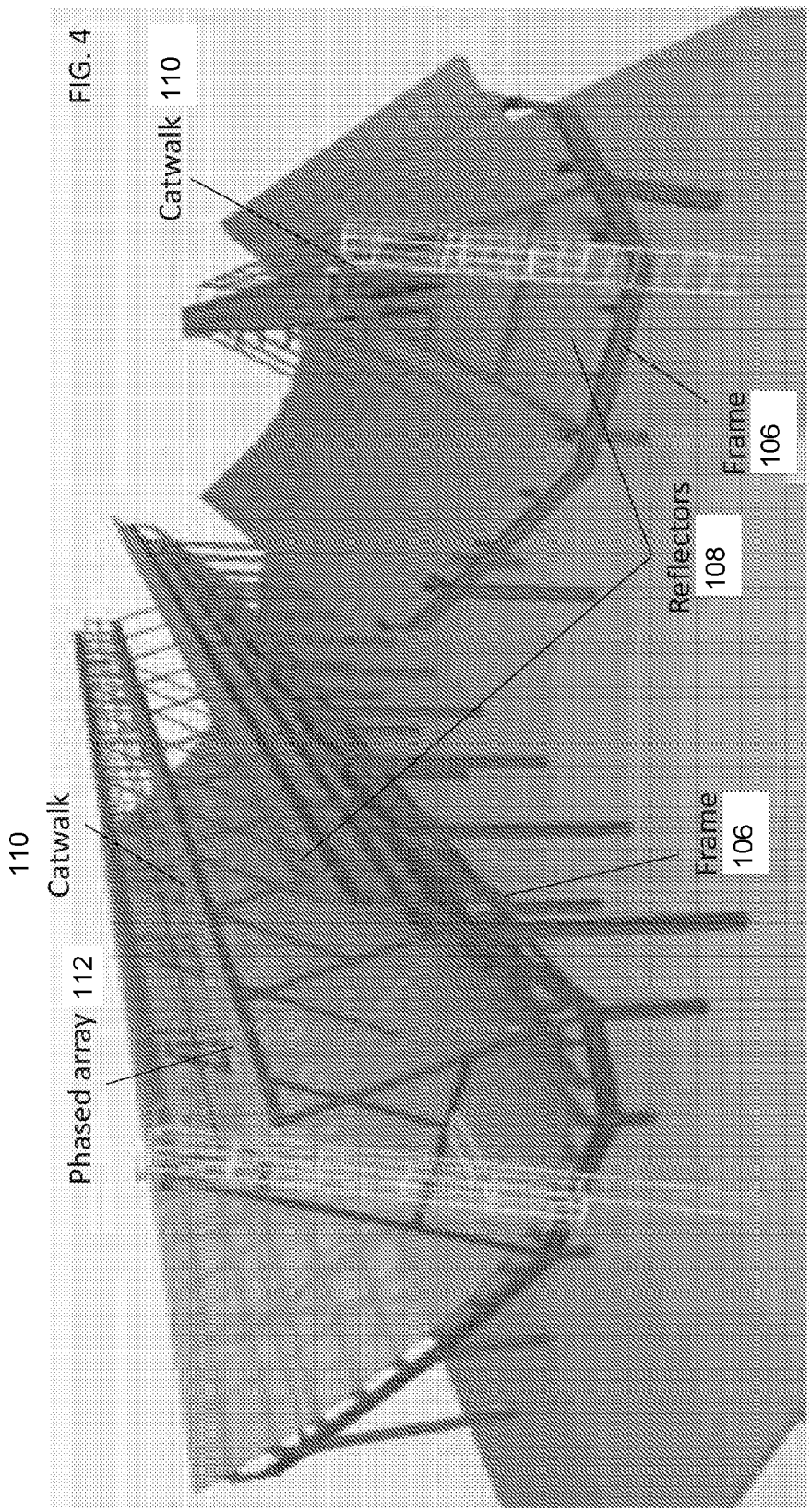

12, the catwalk 110 can be slanted V-shaped or slanted A-shaped. Regardless of how the catwalk 110 is shaped, the catwalk 110 supporting the first 1D phased array 112 can be structurally identical to the catwalk 110 supporting the second 1D phased array 112, but at a larger scale (first scaled up from second). Correspondingly, the first radar has a focus proportionally larger than the second radar. For example, as shown in FIG. 3, the focus of the first radar is 4 meters, whereas the focus of the second radar is 2 meters (scaled down 50%). Likewise, as shown in FIG. 3, the first trough reflector 108 and the second trough reflector 108 are aligned centered.

As shown in FIG. 8, the first 1D phased array 112 or the second 1D phased array 112 can include a set of housings 300. In such configuration, these housings 300 can be positioned on a respective platform 110P immediately adjacent to each other (e.g., side-by-side) over a respective trough reflector 108 (as shown in FIGS. 1, 5, 9). Each housing 300 can include a set of antenna elements 302 (e.g., patch antennas) arranged in a line on that respective housing 300 and facing a respective trough reflector 108. For example, each housing 300 or each antenna element 302 can be electronically steerable to simultaneously beam in different directions, whether independent on each other or dependent on each other.

As shown in FIGS. 2, 10, 11, the defined area 100 includes a container 118 having an internal area sized for a user (e.g., a technician) to walk into, navigate therein, and exit out of. For example, the container can include a shipping container, an intermodal container, a building, a tent, a cabin, a booth, a truck, a van, a bus, or other stationary or mobile structures (e.g., land, aerial, marine). For example, the container 118 can be towable or placeable on a bed of a truck or liftable by a crane or assembled onsite. The container 118 can be weatherproof (e.g., in rain, snow, wind, or desert environments) and have various climate control machinery (e.g., air conditioning, vents, humidifiers, dehumidifiers). The container 118 can receive electrical power from power lines, renewable energy sources, electrical generators, or be battery powered, any of which can be local to or remote from the container 118, whether internal or external to the defined area 100. The container 118 can include plastic, metal, fabric, rubber, wood, alloys, or other suitable materials that avoid signally interfering with the radar pairs 120a and 120b. The container 118 rests on the pad 104 but can be positioned off the pad 104. The container 118 is spaced apart (e.g., avoiding physical contact) from the first frame 106, the first trough reflector 108, the first 1D phased array 112, the second frame 106, the second trough reflector 108, and the second 1D phased array 112.

As shown in FIGS. 10-11, in order to operate the first radar and the second radar, the container 118 contains operates as an operations and control center and contains a logic (e.g., circuitry, processors, memory, transmitters, receivers, signal splitters) positioned within the internal area. The logic is in communication with the first 1D phased array and the second 1D phased array such that the logic controls the first 1D phase array and the second 1D phased array. The logic includes a processor 134 (e.g., servers, GPUs, accelerator cards) positioned within the container 118, a transmitter 138 positioned within the container 118, a set of radio frequency (RF) receivers 136 positioned within the container 118, and a networking interface 140 (e.g., RF-fiber interface) positioned within the container 118. The transmitter 138 and the set of RF receivers 138 are communicably positioned (e.g., interposed) between the processor 134 and the networking interface 140, within the container 118.

As shown in FIG. 11, since the first 1D phased array 112 sends the set of signals to the first trough reflector 108, the processor 134 controls how these signals get generated and sent. Therefore, external (or internal) to the container 118, there is a signal splitter 142 that receives data from the networking interface 140, as originally sent by the processor 134, and splits this data for distribution among the housings 300 for transmission by the antennas 302. Therefore, the signal splitter 142 is coupled (e.g., electrically, communicably) to the logic (e.g., the processor 134, the transmitter 138, the networking interface 140) and the first 1D phased array 112 (e.g., the housings 300) such that the set of signals is generated based on the signal splitter receiving a set of data from the logic and splitting the set of data for distribution to the housings 300 of the first 1D phased array. However, since each of the first 1D phased array 112 and the second 1D phased array 112 receive the reflections from the space object based on the set of signals, there is a group of signal combiners 144 external (or internal) to the container 118. The group of signal combiners 144 combines the set of reflections from the space object and sends those to the processor 134 through the networking interface 140 and the RF receivers 136. Note that the processor 134 sends data to the transmitter 138 and receives data from each of the RF receivers 136. Likewise, note that the transmitter 138 send data to the networking interface 140. Similarly, note that each of the RF receivers 136 receives data from the networking interface 140. Moreover, note that the networking interface 140 sends data to the signal splitter 142 and receive data from the combiners 144. Additionally, note that the splitter 142 sends data to the housings 300 and the combiners 144 receive data from the housings 300.

The first 1D phased array 112 sends the set of signals via the first trough reflector 108 based on a first circular polarization and receives the set of reflections via the first trough reflector 108 based on a second circular polarization. The first circular polarization is not identical to the second circular polarization (e.g., offset in quadrants). The first circular polarization can be opposite the second circular polarization. However, the second 1D phased array 112 receives the set of reflections via the second trough reflector 108 based on the first circular polarization and the second circular polarization.

As shown in FIG. 8, each of the housings 300 is weatherproof (e.g., in rain, snow, wind, or desert environments) and avoids signal interference with the first radar and the second radar, as disclosed herein. Further, each of the housings 300 has a group of cables/cords 310 extending outwardly therefrom (e.g., top side, lateral side). The cables/cords 310 communicably couple to the logic of the container 118 (e.g., the processor 134) and provide electrical power, both in order to enable various send/receive signal operations, as disclosed herein. Additionally, each of the housings 300 has a first plate 304 and a second plate 306 arranged with each other to form an L-shape or a T-shape. The first plate 304 hosts the antennas 302 (e.g., patch antennas) linearly arranged thereon. The first plate 304 faces a respective trough reflector 108 when sending/transmitting, as disclosed herein. The second plate 306 extends into a respective housing 300 and hosts various circuitry driving/powering the antennas 302. Therefore, when the antennas 302 are transmitting towards a respective trough reflector 108, the plate 306 is not externally visible due to its extension into a respective housing 300. Also, each of the housings 300 includes an antenna 308 extending outwardly therefrom (elemental antenna). The antenna 308 is not positioned on the plate 304, but spaced apart therefrom (e.g., within about 2 inches). The antenna 308 is configured to calibrate each of the first radar or the second radar, as disclosed herein.

As shown in FIGS. 1, 2, 5, 7, 10, 13, the defined area 100 includes the first pair 120a and the second radar pair 120b. The second radar pair 120b is similar or identical (e.g., in shape, materials, operation) to the radar pair 120a. For example, the second radar pair 120b has a third radar and a fourth radar. The third radar has a third frame 106, a third trough reflector 108 (also called a parabolic cylinder antenna, a parabolic cylindrical antenna, or a parabolic trough antenna), and a third 1D phased array 112. The third frame 106 is positioned within the defined area 100. The third trough reflector 108 is positioned within the defined area 100, is secured to the third frame 106, and has a third shape, a third longitudinal valley, and a third scale. Similar to the first radar pair 120a, the third 1D phased array 112 is positioned within the defined area 100 and supported by the third frame 106 over the third trough reflector 108 such that the third 1D phased array 112 sends a set of signals via the third trough reflector 108 and receives a set of reflections off the space object based on the set of signals via the third trough reflector 108. Likewise, the fourth radar includes a fourth frame 106, a fourth trough reflector 108 (also called a parabolic cylinder antenna, a parabolic cylindrical antenna, or a parabolic trough antenna), and a fourth 1D phased array 112. The fourth frame 106 is positioned within the defined area 100. The fourth trough reflector 108 is positioned within the defined area 100, secured to the fourth frame 106, and has a fourth shape, a fourth longitudinal valley, and a fourth scale. Similar to the first radar pair 120a, the fourth shape is the third shape, the fourth longitudinal valley extends parallel to the third longitudinal valley, and the fourth scale is lesser than the third scale. The fourth 1D phased array 112 is positioned within the defined area 100. Similar to the first radar pair 120a, the fourth 1D phased array 112 is supported by the fourth frame 106 over the fourth trough reflector 108 such that the fourth 1D phased array 112 does not send any signals via the fourth trough reflector 108 and receives the set of reflections off the space object based on the set of signals via the fourth trough reflector 108.

However, as shown in FIGS. 1, 2, 5, 10, 13, note that the first radar pair 120a and the second radar pair 120b are oriented towards different (e.g., opposite) sides of a sky (e.g., different field of views). This configuration can be accomplished in various ways. For example, this configuration can be accomplished when the second trough reflector 108 of the first radar pair 120a is positioned between the first trough reflector 108 of the first radar pair 120a and the fourth trough reflector 108 of the second radar pair 120b. Likewise, this configuration can be accomplished when the fourth trough reflector 108 of the second radar pair 120b is positioned between the second trough reflector 108 of the first radar pair 120a and the third trough reflector 108 of the second radar pair 120b. Similarly, this configuration can be accomplished when the second radar of the first radar pair 120a and the fourth radar of the second radar pair 120b are positioned between the first radar of the first radar pair 120a and the third radar of the second radar pair 120a. Moreover, this configuration can be accomplished when Rx/Rx radars are positioned between Tx/Rx radars. Resultantly, the set of reflections off the space object received by the first 1D phased array and the second 1D phased array forms a first field of view and the set of reflections received by the third 1D phased array and the fourth 1D phased array forms a second field of view, where the first field of view does not overlap with the second field of view (coverage of different sky areas). This configuration is technologically advantageous for various reasons. For example, if the processor 134 is in communication with the first 1D phased array 112, the second 1D phased array 112, the third 1D phased array 112, and the fourth 1D phased array 112, then the processor 134 can be programmed to track the space object traveling on an orbit within the first field of view (the first radar pair 120a) and the second field of view (the second radar pair 120b) such that the space object traveling on the orbit can be detected from within the defined area 100 at least twice in a single pass over the defined area 100. For example, there can be a 1D phased array-operations and control center (OCC) interface. In particular, a radar site 100 contains pairs of 1-D phased array 112 radars which illuminate parabolic-trough reflectors 108. The trough reflectors 108 are composed of octopods 300, which can each have 8 transmit-receive antenna elements. A TxRx trough 108 (large) is one that transmits and receives, and an RxRx trough 108 (small) is one that receives only. A TxRx trough 108 transmits and receives on a single (but opposite) but polarization, whereas an RxRx trough 108 receives both polarizations. The troughs 108 are controlled from OCC 118. The OCC 118 generates a transmit signal on a server that is generated using a digital transceiver. The transmit signal is sent over fiber (e.g., RF over fiber) to a 64-way (or less or more) splitter which feeds all octopods 300. On receive, the octopods 30 are grouped into batches 8 (or less or more) and combined using passive optical techniques. The received signal is converted to RF in the OCC, sent to a server array 134, and processed. Similarly, for an RxRx trough 108, the receiver signal is routed to the OCC 118.

With respect to the first radar pair 120a and the second pair 120b, the second longitudinal valley can extend parallel to the fourth longitudinal valley or the first longitudinal valley can extend parallel to the third longitudinal valley. However, note that this can configuration vary where the second longitudinal valley does not extend parallel to the fourth longitudinal valley or the first longitudinal valley does not extend parallel to the third longitudinal valley.

As shown in FIGS. 11-31, another technological advantage of the defined area 100 having the first radar pair 120a and the second radar pair 120b manifests itself in determining an initial orbit for the space object. In particular, the processor 130 can be in communication with the first 1D phased array 112, the second 1D phased array 112, the third 1D phased array 112, and the fourth 1D phased array 112. Therefore, as shown in FIGS. 15-20, the processor 134 can be programmed to cause the first 1D phased array 112 and the second 1D phased array 112 to detect the space object within the first field of view based on the set of reflections off the space object, as received by the first trough reflector 108 and the second trough reflector 108. As shown in FIG. 13, this occurs based on a trajectory of the space object (e.g., a satellite) intersecting the first field of view (1D) of the first radar pair 120a. Then, as shown in FIGS. 15-20, the processor 134 can determine an initial orbit (e.g., trajectory data) for the space object based on this set of reflections. For example, this can occur based on getting a first tracklet from the first trough reflector 108 and a second tracklet from the second trough reflector 108, selecting a best candidate from each of the first tracklet and the second tracklet (e.g., dynamical measurement fitter), and then guessing the initial orbit based on the best tracklets.

The initial orbit can be determined for various reasons. For example, the initial orbit can be determined when the space object is not listed in a record of a set of records (e.g., a new space object) in a database (e.g., relational, in-memory, No-SQL, graphical, cloud) remote from the processor (e.g., Amazon cloud computing instance), where the set of records corresponds to a set of space objects other than the space object. For example, the initial orbit can be determined when the space object that is recorded in a record of a database (e.g., relational, in-memory, No-SQL, graphical, cloud) remote from the processor (e.g., Amazon cloud computing instance) lacks an orbit parameter (e.g., velocity, height, current position, expected position) corresponding to the space object for a predetermined time period (e.g., data for the space object is stale, need to reinitialize orbits for known space objects with no or minimal measurements for a predetermined time period).

Regardless of why the initial orbit is determined, the processor 134 can create a schedule for the third 1D phase array 112 and the fourth 1D phased array 112 to detect the space object after the initial orbit for the space object is determined. For example, the schedule can include date, time, and positional expectancy for the space object for the second radar pair 120b. Then, the processor 134 can cause the third 1D phased array 112 and the fourth 1D phased array 112 to detect the space object within the second field of view based on the set of reflections off the space object as received by the third trough reflector 108 and the fourth trough reflector 108 according to the schedule. This occurs based on a trajectory of the space object (e.g., a satellite) intersecting the second field of view (1D) of the second radar pair 120b. Then, the processor 134 can take an action associated with the initial orbit responsive to the space object being detected within the second field of view based on the second set of reflections according to the schedule. Some of such actions can include modifying the initial orbit such that a new orbit (e.g., trajectory data) is formed, keeping the initial orbit as is, creating a new orbit (e.g., trajectory data) based on the initial orbit, or others. Note that since the space object traveling on the orbit can be detected from within the defined area 100 at least twice in the single pass over the defined area 100, the processor 134 should be located within the defined area 100 in order to minimize latency and expedite real-time processing since there may be a short time period (e.g., seconds, tens of seconds) between the space object being detected by the first radar pair 120a and when the space object is scheduled to detected by the second radar pair 120b.

For example, there can be an initial orbit determination based on multiple troughs 108. In particular, a user (e.g., a technician, a satellite operator, an insurance company) may want to be able to detect uncatalogued (e.g., not included in a database for catalogued space objects) various space objects (e.g., satellites) at a single radar site 110, and form the initial orbit determination so that the user can maintain knowledge custody of those space objects and add data for those space objects to the catalog (e.g., database). As such, a target (e.g., a satellite) can be detected in a first trough 108 or a first pair of troughs 108, as disclosed herein, where at least some measurements an include a series of range, doppler, and angle measurements. Then, the initial orbit is formed using these measurements (this should be done relatively quickly or in real-time). Then, a prediction of when and where the target will cross a second trough 108 or a second pair of troughs 108 is made. Then, the second trough 108 or the second pair of troughs 108 is scheduled to detect the target. Since the pass through the second trough 108 or the second pair of troughs 108 can be tens of seconds after the detection in the first trough 108 or the first pair of troughs 108, this should be done relatively quickly or in real time. Then, based on the schedule, a detection is made in the second trough 108 or the second pair of troughs 108. Then, the data is combined to form an initial orbit determination and can then be used for follow up at other radar sites, whether similar or dissimilar to the radar site 100.

In terms of a software architecture to enable determining of the initial orbit, as shown in FIGS. 22-31, there can be group of scripts (e.g., Python, JavaScript), where one of these scripts performs various environmental functions (e.g., file path, basic setting, input/out libraries declarations, function calls) and another one of these scripts performs various operations on backend (e.g., time format conversion, orbit expression conversion, cost function minimization, residual calculation).

Figure 23:
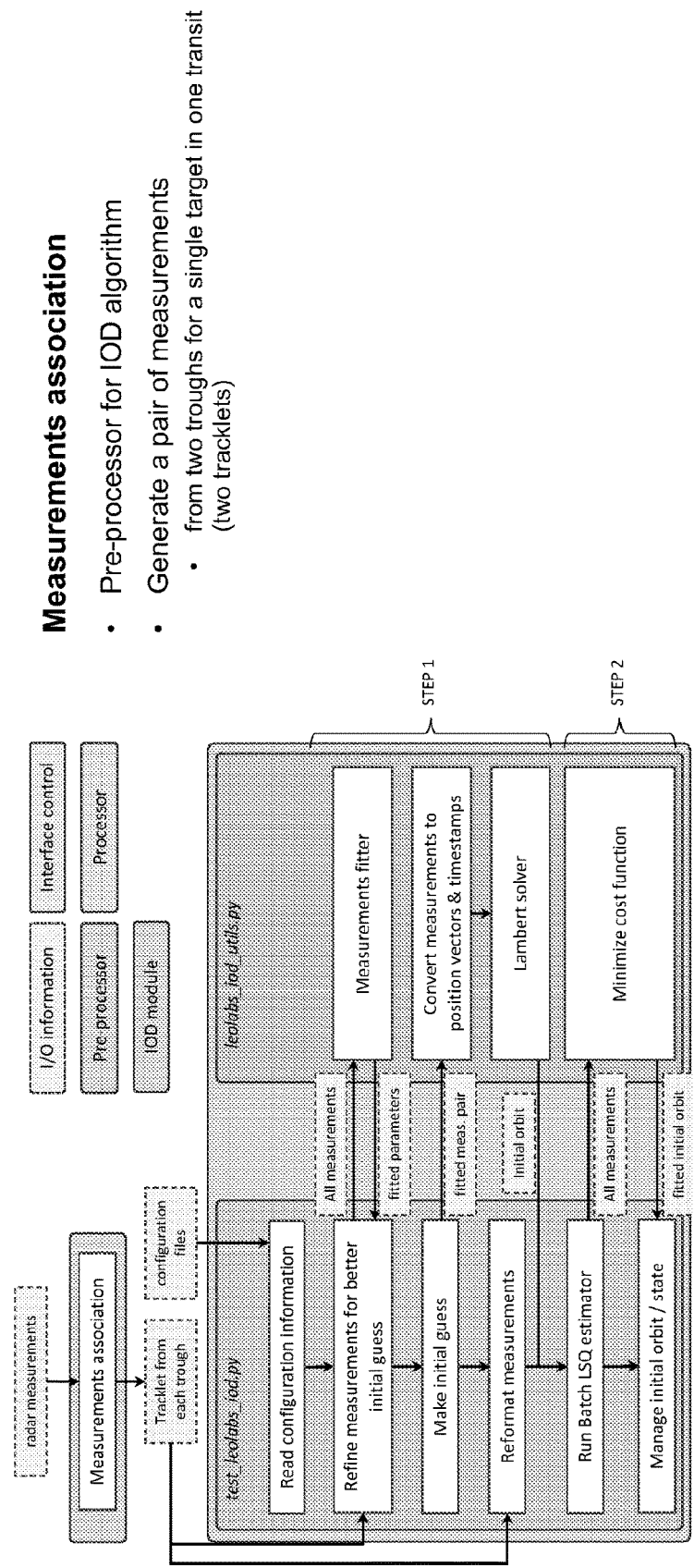
Figure 24:
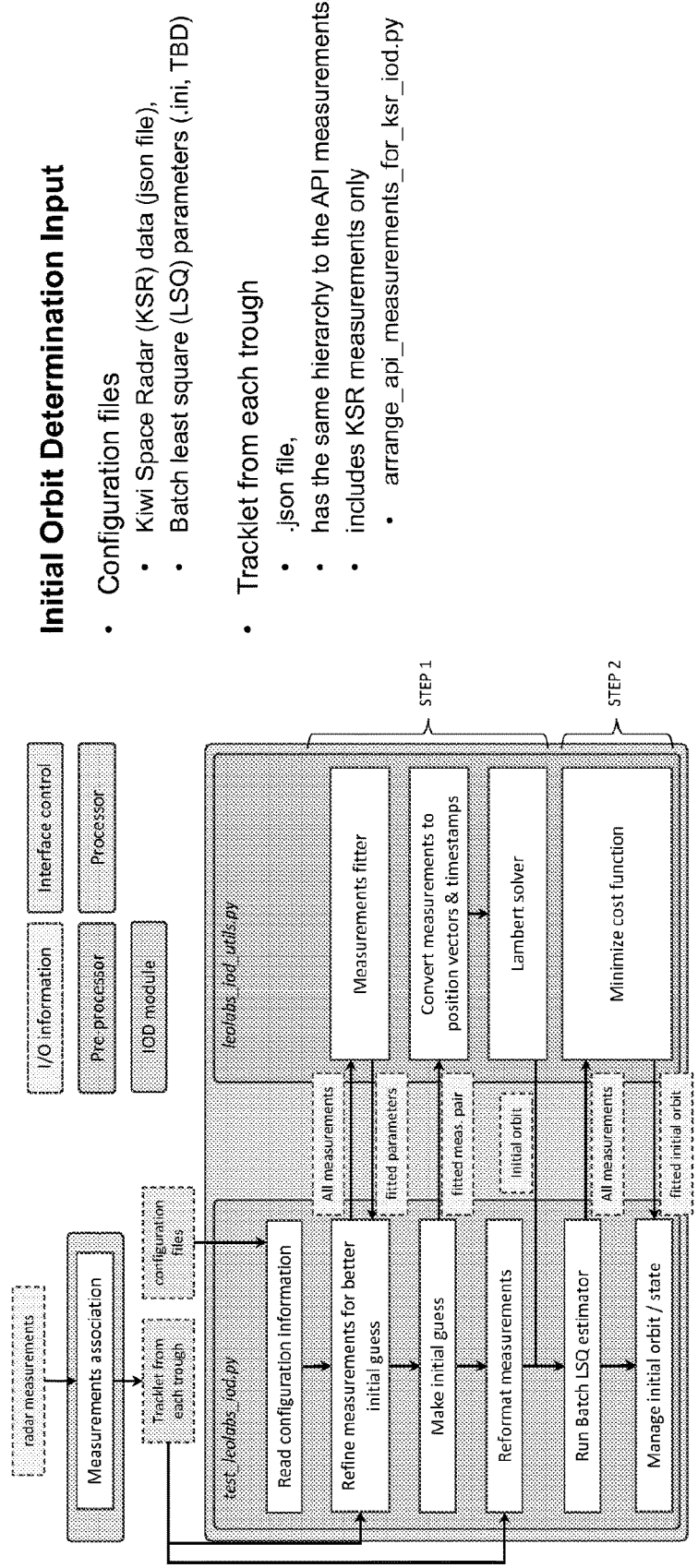
Figure 25:
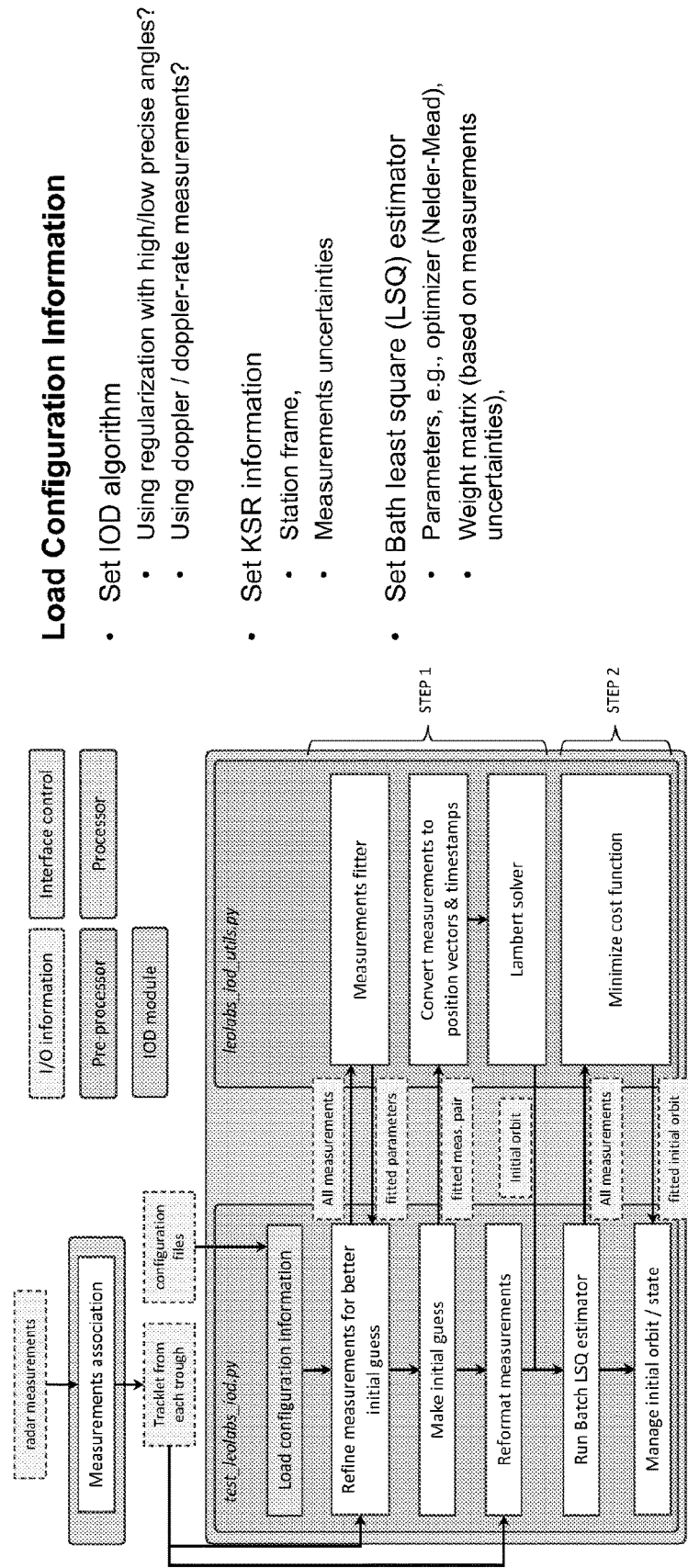
Figure 26:
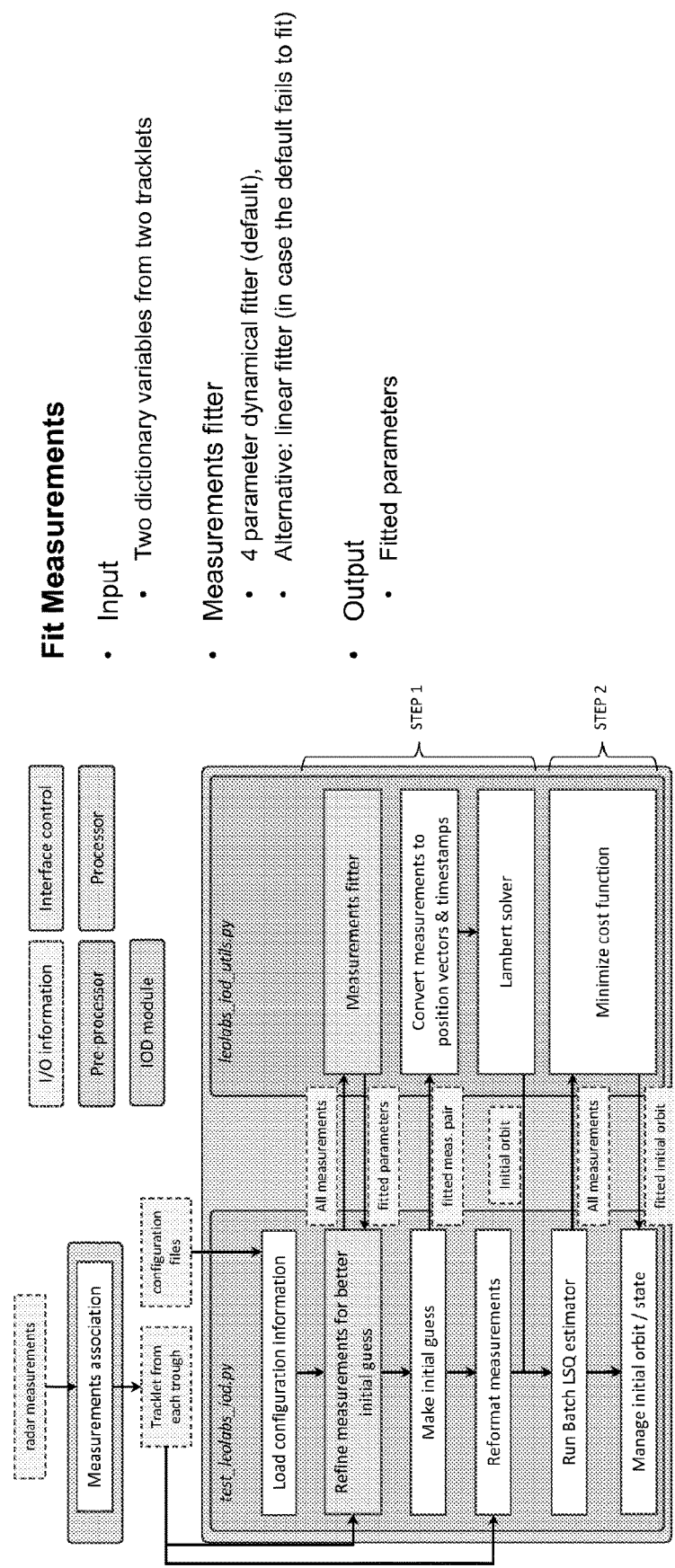
Figure 28:
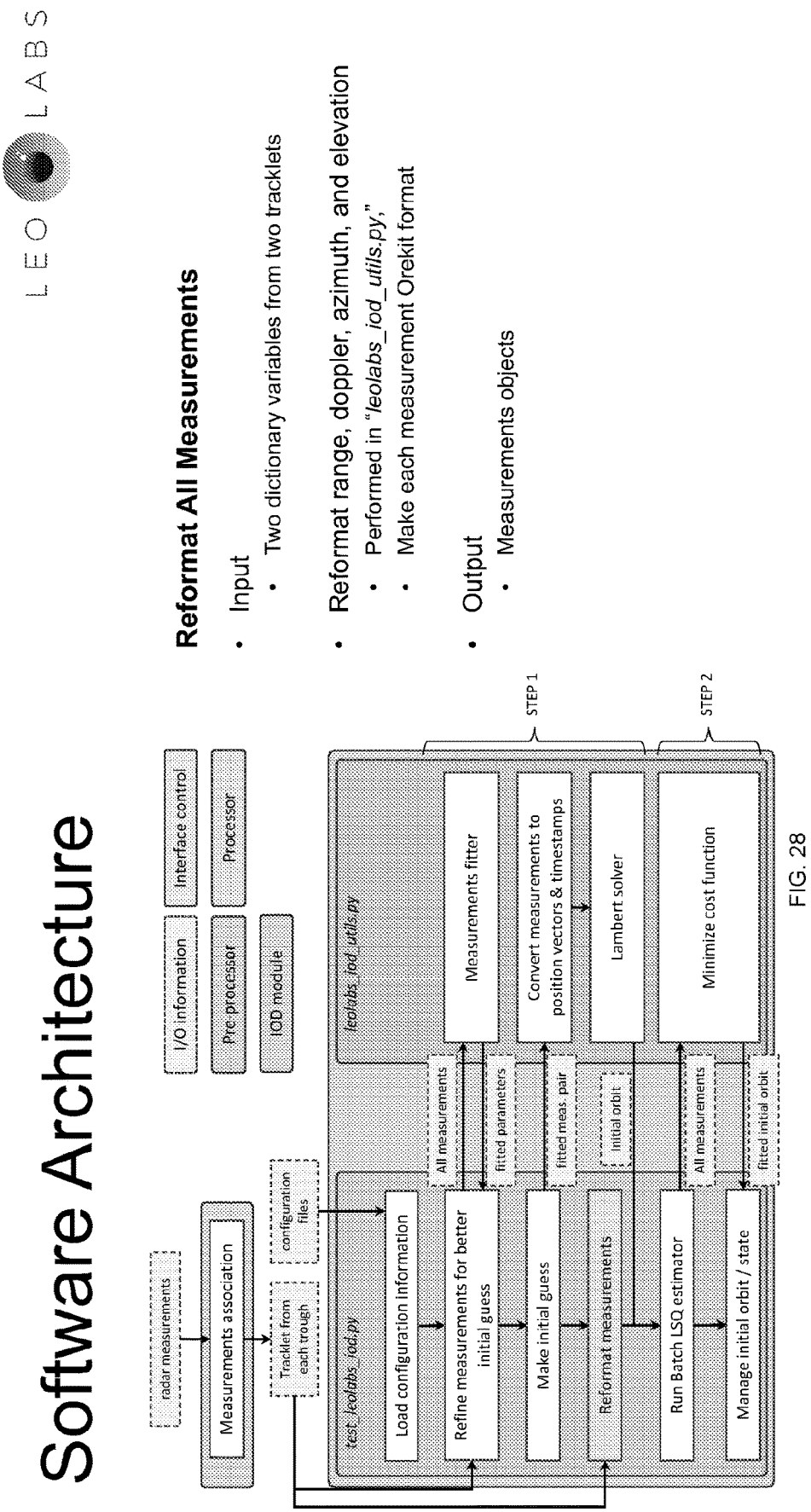
Figure 29:
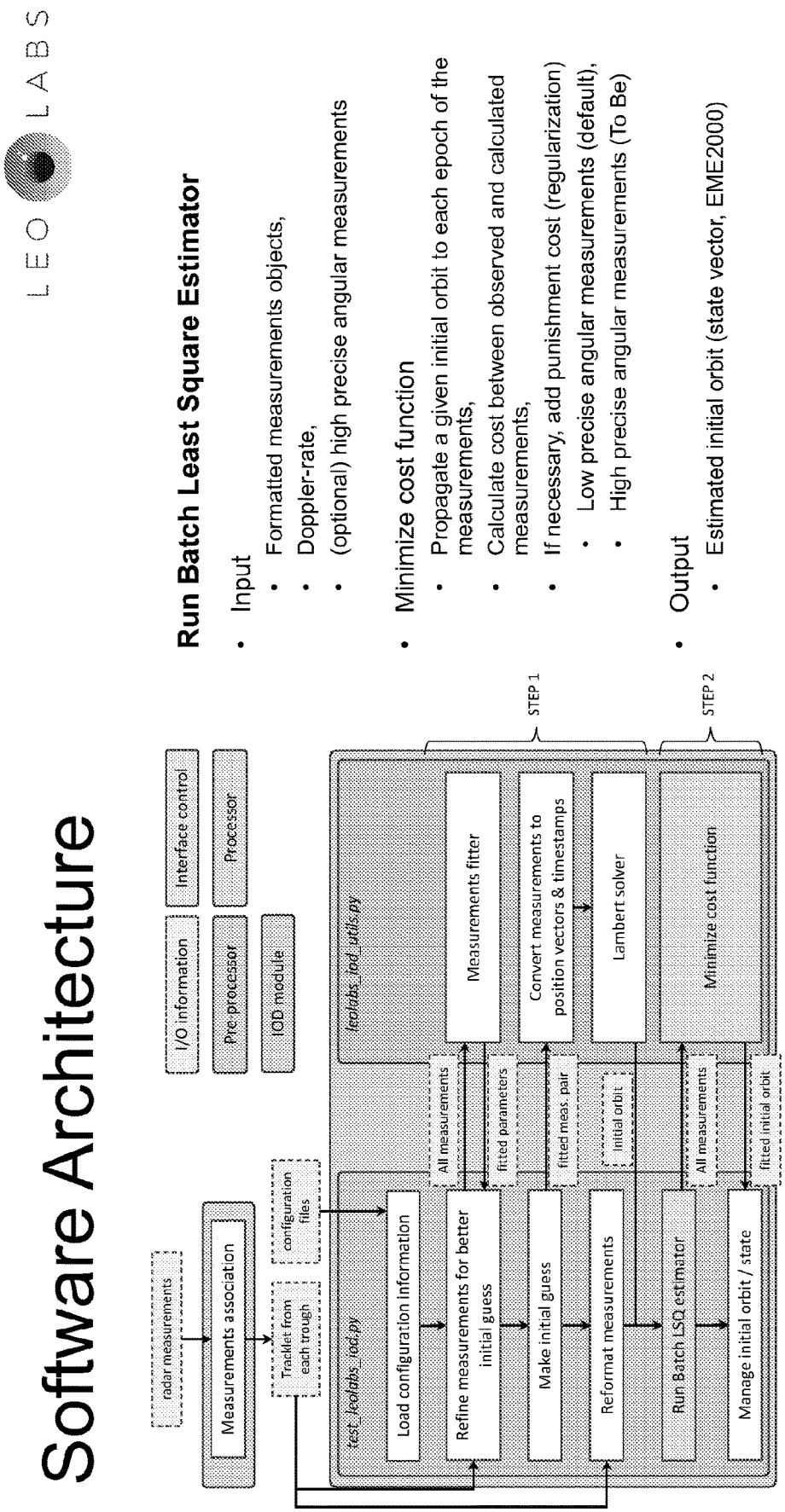
Figure 30:
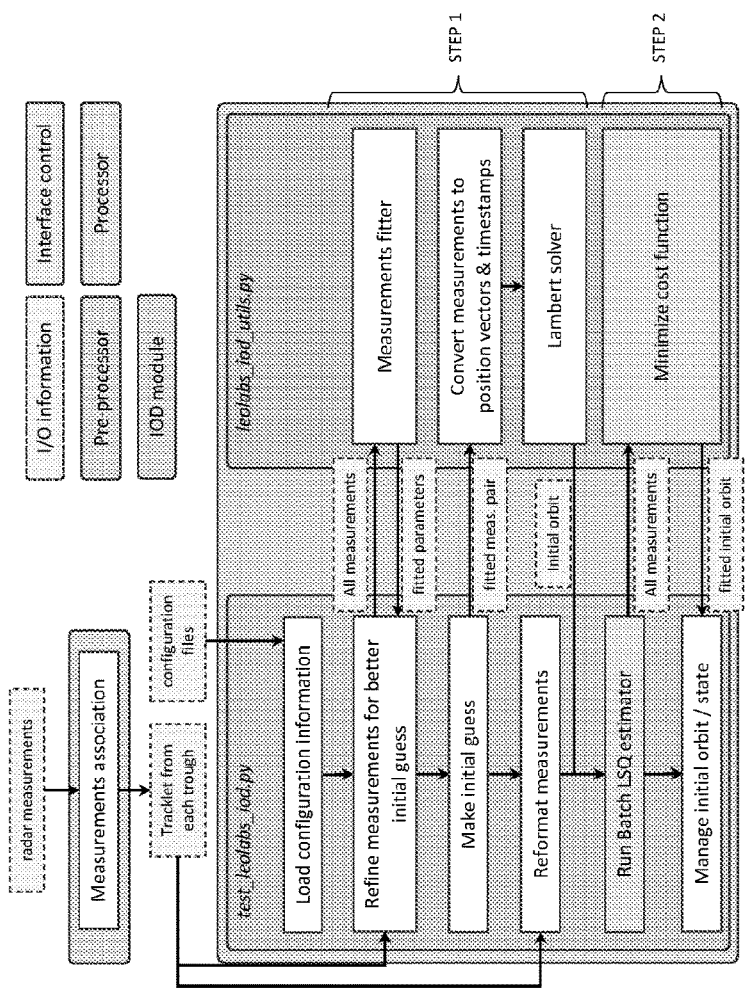
Figure 31:
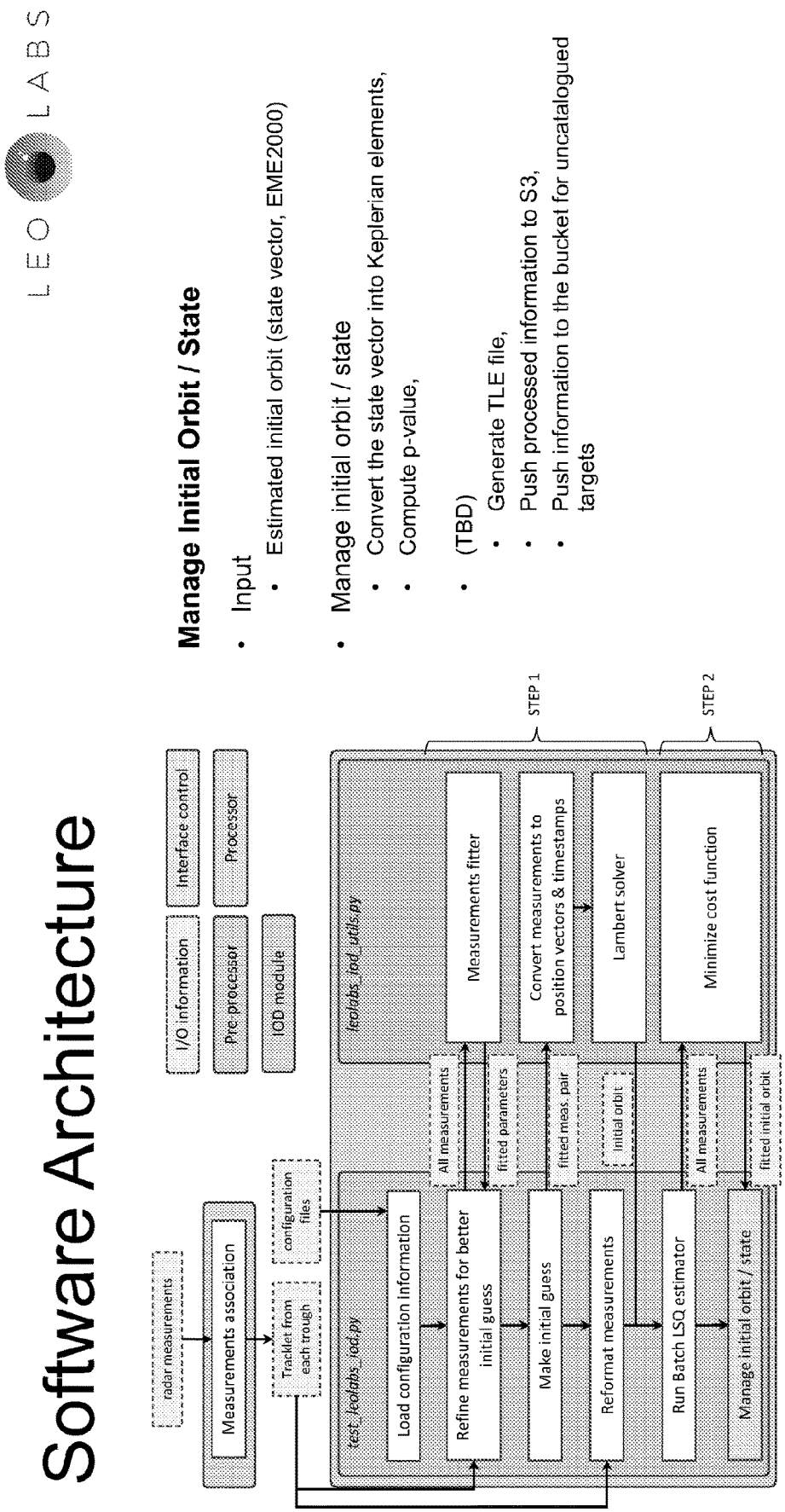

As shown in FIG. 23, the group of scripts is contained within a module that receives data from configuration files and data from the tracklets of each of the first radar pair 120a and the second radar pair 120b. The data from the tracklets is sourced from a pre-processor as fed by each of the first radar pair 120a and the second radar pair 120b. Within the module, the scripts bidirectionally communicate with each other. For example, some measurements and fitted measurement pairs can be sent from one of the scripts (environmental functions). Likewise, some fitted parameters, data from a Lambert solver, and data for fitted initial orbits can be sent from one of the scripts (backend). How these operations occur is shown in FIGS. 24-31.

As shown in FIGS. 32-33, another technological benefit of having the radar pair 120a or the radar pair 120b manifests itself in performing radar interferometry. In particular, the processor 134 can be in communication with the first 1D phased array 112 (or the third 1D phased array 112) and the second 1D phased array 112 (or the fourth 1D phased array 112). Then, the processor can be programmed to perform a radar interferometry for the space object detected based on the first 1D phased array 112 sending the set of signals via the first trough reflector 108 (or the third trough reflector 108) towards the space object and receiving the set of reflections off the space object by the first 1D phased array 112 (or the third 1D phased array 112) via the first trough reflector 108 (or the third trough reflector 108) and by the second 1D phased array 112 (or the fourth 1D phased array 112) via the second trough reflector 108 (or the fourth trough reflector 108). The radar interferometry can include converting a set of time series formed from a set of independent data channels into a best-fit range, a radial velocity, a radial acceleration, and an x/y offset position.

Using the first radar pair 120a or the second radar pair 120b, as disclosed herein, enables at least some capture of various interferometric metrics to determine in high precision a location of a target (e.g., a space object, a satellite) within a beam from a respective 1D phased array reflected by a respective trough reflector 108. FIG. 32 shows a sample configuration of receive channels. Here, there is a sub-digitization of a TxRx trough reflector 108 (large) into 4 groups (black dots). Note that a RxRx trough reflector 108 (small) has a single channel (blue dot). The RxRx trough reflector 108 is separated in a direction perpendicular from the TxRx trough reflector 108 and such positioning provides a unique interferometric baseline, which provides sensitivity to the position of the target in the y direction. The sub-sampling of the aperture of the TxRx trough reflector 108 provides sensitivity to the position of the target in the x direction.

The separation of the trough reflectors 108 is chosen to create unambiguous images of the target locations. If the trough reflectors 108 were too far apart, then the resolution would increase, but the grating lobes would provide ambiguity in the target location. Adding more RxRx trough reflectors 108 would allow one to achieve both higher precision and unambiguous positional information.

As shown in FIG. 33, the data from the sub channels are combined to form interferometric estimates of the target position within the beam. Broadly, the main goal is to convert a single set of time series from several independent data channels into a best-fit range, radial velocity, radial acceleration, and x/y offset position (relative to the nominal beam center). Also produced are the per-channel phase residuals and the per-channel best-fit signal level. The per-channel values are valuable for evaluating and updating phase calibrations.

As shown in FIGS. 32-33, a key input to the process is an initial detection of a target. The target data will have been identified through the standard (non-interferometric) detection approach. The target data could also be provided by a high-fidelity state vector. The input will include a range and radial velocity estimate so that a broad search on those dimensions is not necessary. Some sources for those values include a previously run coherent or incoherent processing or a high-fidelity state vector. For example, the input range/doppler values should have errors of less than 1 km and 100 m/s, respectively, although this can vary as needed.

As shown in FIG. 33, the processor 134 (e.g., an interferometric processor) can be programmed to mix the time series with the nominal radial velocity and acceleration. Then, the processor 134 can demodulate the ranges-of-interest. Note that it is assumed that the number of ranges-of-interest will be smaller than about 1 km, although this can vary as needed. Then, the processor 134 can filter/downsample the data. Note that due to the small number of ranges- and radial velocities-of-interest, this is the sole downsample stage for this module. Then, the processor can perform interpolation in range. Then, the processor 134 can calculate the complex Fourier spectra of each channel. Then, the processor 134 can fit and interpolate over range/velocity/acceleration and form the best-fit complex visibilities. Then, the processor can resample the visibilities onto a 2D UV grid and transform into a synthesized image. Then, the processor 134 can identify the peak signal in the synthesized image to find the best-fit position of the target. Then the processor 134 can use the target position and assumption of a point source to find the individual channel phase errors via self-calibration.

For example, as disclosed herein, this disclosure discloses a design for a radar to track a space object. The radar can include multiple reflectors 108, each of which can be illuminated by a 1D phased array feed 112, which can nominally operate in an S-band frequency range. The reflectors 108 can come in pairs—one that is able to transmit and receive (the first radar), and the other which is able to receive only (the second radar). This combination allows to measure range, range-rate (e.g., Doppler), and two-dimensional angles of space objects passing through a field-of-view (FOV), the latter can use methods of radar interferometry. For example, an instantiation can include at least two pairs of reflectors 108 on a given site (e.g., within a defined, zoned, or enclosed area 100). One pair 120a is pointed or directed at a set angle (e.g., 20 degrees off-vertical) in one direction, and the other pair 120b is pointed or directed at a set angle (e.g., 20 degrees off-vertical) in another direction, which can be an opposing direction. This combination allows to measure space objects at multiple points in a single pass over the site, as the space objects cross the FOVs, and use that to construct an initial orbit determination (IOD) of the space objects. Although FIGS. 1-39 show some dimensions, orientations, and parameters, note that these dimensions, orientations, and parameters are illustrative and can vary, whether greater or lesser, as needed.

As shown in FIGS. 1-39, a site-level design 100 for a radar tracking system can include pairs of radar troughs 108. The radar troughs 108 can include arrays of electronic boxes 300 (or housings or containers) called octopods. Each trough 108 enables precisely measurement of range, range-rate (e.g., Doppler), and angles of space objects. Further, the radar tracking system can enable a method of estimating an angle to a target (e.g., space object) can be performed by digitizing groups of octopods 300 within a single trough, and a method of estimating a second angle to a target by using the Rx/Rx trough, and combining those to precisely estimate a position of the target within a radar beam. Also, the radar tracking system enables a calibration measurement system.

As shown in FIGS. 1-39, a site design can includes 2 (or more or less) large reflectors 108 (Tx/Rx reflectors), 2 (or more or less) small reflectors 108 (Rx/Rx reflectors), operations and control center 118 (e.g., within a shipping container or another enclosure), and cabling/power plant/grounding/internet/fencing/etc. The reflectors 108 can come in pairs—one large Tx/Rx reflector 108 and a smaller Rx/Rx reflector 108. The Tx/Rx reflector 108 can transmit one circular polarization, and receives the other. The Rx/Rx reflector 108 can receive both polarizations. The Tx/Rx system can be divided into 4 (or more or less) segments for doing interferometric angle measurements (Up/Down in FIG. 3). The Rx/Rx system can allow for angle measurement in the other dimension (Left/Right in FIG. 3)

As shown in FIGS. 1-39, a reflector 108 can include a steel-beam frame 106 (or another material or another metal or alloy), a plurality of aluminum (or another material or another metal or another alloy) mesh panels that are mounted (e.g. fastening, adhering, mating, interlocking, adhering) on the reflector, a catwalk 110 that gives access to a focus zone, and transmit-receive electronics 300 (Octopods) at the focus zone, which illuminate the mesh panels.

The reflectors 108 can be parabolic troughs, i.e., cylindrical paraboloids, and can be designed to point at a specific angle off vertical (e.g., 20 degrees), but oriented such that a focal array is pointed straight down at a ground, pad, vehicle (e.g., land, marine, aerial), or platform, on which the reflector 108 is hosted. Note that the specific angle is not limited to about 20 degrees, but can be greater or lesser, whether perpendicular or non-perpendicular (e.g., between about 0 and about 90 degrees).

Sometimes, in order for a phased array radar to operate effectively, an electronic and cable phase delay of some, each, many, most, or all paths must be precisely calibrated. This signal calibration can occur in several ways. One way of signal calibration has some, many, most, or all octopods 300 has a calibration antenna 308 thereon. Various switches in the octopod 300 allow one to transmit from that antenna 308 and receive on an element 302, transmit on an element 302 and receive on that antenna 308, and transmit from one octopod 300 to another. In addition, one is able to loop a signal through various portions of an RF chain to measure and calibrate phase. Another way of signal calibration has several antennas 146 embedded into a surface of the reflector 108. One can transmit from that calibration antenna 146 and receive at an octopod element 300, or transmit from the octopod 300 and receive at the calibration antenna 146 to measure phase and amplitude. This configuration/technique combined with a theoretical model of phase delays can be used to calibrate the phased array. Yet another way of signal calibration has the calibration antenna in a far-field of up to 8 elements of the array, although more or less are possible. Thus, the calibration antenna can be used to measure a beam pattern of an octopod 300 or overlapping elements of the octopods 300. An adaptive beamforming approach can be implemented that tunes the beam pattern to best fit a theoretical model of the gain pattern. This approach can utilize only the signal strength, and not the phase, of the resulting pattern.

There can be many (more than two) pairs of reflectors 108 at a given site, such as 2, 3, 4, 5, 6, 7, 8, 9, 10, tens, hundreds, thousands, or more inclusive of intermediate whole values therebetween. Further, there can be multiple Rx/Rx troughs 108 for a given Tx/Rx trough (e.g., many-to-one correspondence). For example, there can be at least 1, 2, 3, 4, 5, 6, 7, 8, 9, 10, tens, hundreds, thousands, or more inclusive of intermediate whole values therebetween. These Rx/Rx 108 can be positioned adjacent to or around the given Tx/Rx 108, whether feet, yards, or miles apart, depending on angle desired. These Rx/Rx 108 can also be successively or consecutively positioned in a line (e.g. train manner) or in a closed shape (e.g., O, D, P) or open shape (e.g., U, C, J, S, L) about the Tx/Rx.

As shown in FIGS. 1-39, there can be a system comprising: a frame 106; a reflector 108 supported via the frame 106; a catwalk 110 extending over the reflector 108; and a phased array 112 supported via the catwalk 110 and directed at the reflector 108 such that a space object can be tracked. The frame 106 can be supported via a volume of soil 102 or ground. The frame 106 can be supported via a vehicle (e.g., land, marine, aerial). The frame 106 can be supported via a sea platform, inclusive of any body of water platform. The phased array 112 is a 1D phased array. The phased array 112 can operate in an S-band frequency range. The phased array 112 can be oriented at a ground surface. The phased array 112 can transmit a plurality of first signals via the reflector 108 and can receive a plurality of second signals (e.g., reflections) via the reflector 108. The phased array 112 can avoid transmit any signals via the reflector 108 and yet receive a plurality of signals (e.g., reflections) via the reflector 108. The reflector 108 can be a parabolic trough. The reflector 108 can be a cylindrical paraboloid. The phased array 112 and the reflector 108 can be positioned such that the phased array 112 directs a plurality of signals to the reflector 108 and the reflector 108 reflects the signals at a non-perpendicular angle. The non-perpendicular angle can be between about 0 degrees and 90 degrees, and within that range less than about 80 degrees, less than about 70 degrees, less than about 60 degrees, less than about 50 degrees, less than about 40 degrees, less than about 30 degrees, less than about 25 degrees, greater than about 5 degrees, greater than about 10 degrees, greater than about 15 degrees, between about 15 degrees and about 25 degrees, about 20 degrees, or others. The phased array 112 and the reflector 108 can be positioned such that the phased array 112 directs a plurality of signals to the reflector 108 and the reflector 108 reflects the signals at a perpendicular angle. The pad 104 can support the frame 106. The pad 106 can be positioned such that the reflector 108 extends between the pad 106 and the catwalk 110. The pad 106 can be positioned such that the reflector 108 extends between the pad 104 and the phased array 112. The shipping container 118 contains a set of logic (e.g., circuitry, cables, switches, amplifiers, encoders) in control communication with the phased array 112. The pad 104 can support the shipping container 118. The phased array 112 can transmit a circular polarization. The phased array 112 can enable a measurement of an interferometric angle along a vertical axis, where the interferometric angle is associated with the space object. The phased array 112 can enable a measurement of an angle along a horizontal axis, where the angle is associated with the space object. The frame 106 or the catwalk 110 can include a metal or an alloy. The reflector 108 can include a plurality of mesh panels. At least one of the mesh panels can include a metal or an alloy. The catwalk 110 or the reflector 108 can be assembled to the frame (e.g. fastening, mating, interlocking, adhering). The phased array 112 can include a plurality of housings 300 that are separate and distinct from each other. The housings 300 can be positioned along the catwalk 110 longitudinally and linearly. At least one of the housings 300 can host a plurality of antennas 302 linearly spaced apart from each other. At least one of the antennas 302 can be a patch antenna. The housings 300 can be are positioned along the catwalk such that the antennas are linearly co-aligned. At least one of the housings 300 can host a calibration antenna 308. At least one of the housings 300 can host a plurality of patch antennas 302 and a plurality of switches, where the switches are coupled to the calibration antenna 308 and to the patch antennas 302 such that (1) the calibration antenna 308 transmits a first signal and at least one of the patch antennas 302 receives a second signal, and (2) at least one of the patch antennas 302 transmits a third signal and the calibration antenna 308 receives a fourth signal. At least two of the housings 300 can transmit at least two signals between each other. At least one of the housings 300 loops a signal through various portions of an radiofrequency (RF) chain in order to measure or to calibrate a signal phase. The reflector 108 can include a trough with a surface and there can be an antenna 146 embedded into the surface. The antenna 146 can transmit a signal to the phased array 112 such that at least one of a phase of the signal or an amplitude of the signal is measured. The phased array 112 can transmit a signal to the antenna 146 such that at least one of a phase of the signal or an amplitude of the signal is measured. The catwalk 110 can be supported via an A-shaped column. For example, the catwalk 110 can span between a plurality of A-shaped columns. The catwalk 110 can be supported via a non-A-shaped column (e.g. J-shaped, T-shaped, L-shaped, J-shaped, V-shaped, M-shaped, C-shaped, U-shaped, D-shaped). For example, the catwalk 110 can span between a plurality of columns. Regardless of shape, the column can include metal, alloy, plastic, wood, rubber, or other materials. The catwalk 110 can be suspended over the reflector via a plurality of lines (e.g. ropes, cables, chains).

As shown in FIGS. 1-39, there can be a system comprising: a parabolic reflector 108; and a phased array 112 including a first housing 300 and a second housing 300. The first housing 300 can hosts a plurality of first patch antennas 302 facing the parabolic reflector 108, where the first patch antennas 302 are linearly spaced apart from each other. The second housing 300 can hosts a plurality of second patch antennas 302 facing the parabolic reflector 108, where the second patch antennas 302 are linearly spaced apart from each other. The first housing 300 can be positioned adjacent to the second housing 300 such that the first patch antennas 302 and the second patch antennas 302 are linearly co-aligned and receive a plurality of signals via the parabolic reflector 108. The signals is a plurality of first signals and the first housing 300 is positioned adjacent to the second housing 300 such that the first patch antennas 302 and the second patch antennas 302 are linearly co-aligned and transmit a plurality of second signals via the parabolic reflector 108. The phased array 112 can be a 1D phased array.

As shown in FIGS. 1-39, there can be a system comprising: a first assembly including a first frame 106, a first reflector 108 supported via the first frame 106, a first catwalk 110 extending over the first reflector 108, and a first phased array 112 supported via the first catwalk 110 and directed at the first reflector 108. The first phased array 112 can transmit a plurality of first signals via the first reflector 108 and the first phased array 112 receives a plurality of second signals (e.g., reflections off the space object based on the first signals) via the first reflector 108. The system can comprise a second assembly including a second frame 106, a second reflector 108 supported via the second frame 106, a second catwalk 110 extending over the second reflector 108, and a second phased array 112 supported via the second catwalk 110 and directed at the second reflector 108. The second phased array 112 does not transmit any signals via the second reflector 108 and the second phased array 112 receives a plurality of third signals (e.g., reflections off the space objects based on the first signals) via the second reflector 108. The first signals are transmitted off-vertical in a general direction, wherein the second signals and the third signals are received off-vertical in the general direction.

As shown in FIGS. 1-39, there can be a system comprising: a first radar pair 120a including a first assembly and a second assembly. The first assembly includes a first frame 106, a first reflector 108 supported via the first frame 106, a first catwalk 110 extending over the first reflector 108, and a first phased array 112 supported via the first catwalk 110 and directed at the first reflector 108. The first phased array 112 transmits a plurality of first signals via the first reflector 108 and the first phased array 112 receives a plurality of second signals (e.g., reflections off the space object based on the first signals) via the first reflector 108. The second assembly includes a second frame 106, a second reflector 108 supported via the second frame 106, a second catwalk 110 extending over the second reflector 108, and a second phased array 112 supported via the second catwalk 110 and directed at the second reflector 108. The second phased array 112 does not transmit any signals via the second reflector 108 and the second phased array 112 receives a plurality of third signals (e.g., reflections off the space object based on the first signals) via the second reflector 108. The system can comprise a second radar pair 120b including a third assembly and a fourth assembly. The third assembly includes a third frame 106, a third reflector 108 supported via the third frame 106, a third catwalk 110 extending over the third reflector 108, and a third phased array 112 supported via the third catwalk 110 and directed at the third reflector 108. The third phased array 112 transmits a plurality of fourth signals via the third reflector 108 and the third phased array 112 receives a plurality of fifth signals (e.g., reflections off the space object based on the fourth signals) via the third reflector 108. The fourth assembly includes a fourth frame 106, a fourth reflector 108 supported via the fourth frame 106, a fourth catwalk 110 extending over the fourth reflector 108, and a fourth phased array 112 supported via the fourth catwalk 110 and directed at the fourth reflector 108. The fourth phased array 112 does not transmit any signals via the fourth reflector 108 and the fourth phased array 112 receives a plurality of sixth signals (e.g., reflections off the space object based on the fourth signals) via the fourth reflector 108. The system can comprise a defined area 110 (e.g. fenced area, enclosed area, raised area, visually distinct area) containing the first radar pair 120a and the second radar pair 120b. The first radar pair 120a is pointed off-vertical in a first direction and the second radar pair 120b is pointed off-vertical in a second direction (e.g., different direction, not overlapping direction, opposing direction) such that a space object can be tracked at a plurality of points (e.g., V-manner).

Radar Calibration

As stated above, this disclosure describes not only various embodiments for a radar system for tracking space objects, it also describes embodiments for radar calibration. While the radar calibration embodiments described herein below relate to the radar system embodiments described above; the radar calibration embodiments are not necessarily limited to the specific radar system embodiments described above.

The performance of any radar system, for example, the ability of the radar system described herein above, to initialize the orbit of a space object and, thereafter, track the space object, highly depends on the accuracy of the radar. As those skilled in the art will readily appreciate, to insure accuracy, the radar must be periodically calibrated. This is particularly true of phased array radar systems, as each element of the radar array may exhibit unique differences in amplitude and phase due, for example, to manufacturing tolerances associated with hardware components and RF cables, temperature, age of the equipment and drift over time. Thus, in order to ensure the accuracy of the radar system, quantifying the differences associated with the radar, or each radar element, and adjusting the radar as a function of the quantified differences to remove the effects of the differences and equalize the radar elements are absolutely necessary.

Herein below, two radar calibration techniques will be described. Both techniques involve calibrating the phase of the radar, and more particularly, the phase of each phased array element of the radar. The first technique is referred to herein as external phase calibration, whereas the second technique is referred to as internal phase calibration. As we will discuss below, the internal phase calibration involves two calibration processes, an inter-radar assembly phase calibration and a channel phase calibration. Both the external and internal phase calibration techniques will be described in accordance with a number of exemplary embodiments.

External Phase Calibration

The external phase calibration technique is "external" because it involves transmitting radar signals from a plurality of phased array antennas (radar elements), located inside one or more radar assemblies, to one or more calibration antennas embedded on a surface of a far-field radar reflector (herein "reflector" or "trough"). It also involves receiving signals at each of the plurality of phased array antennas, which are transmitted from each of the one or more calibration antennas.

In the exemplary embodiments of the radar system described above, the radar assemblies, which house the phased array antennas, are referred to as octopods because, in a preferred embodiment, each radar assembly comprises 8 phased array antennas. See e.g., FIG. 8 (reference no. 302). It will be understood that a radar assembly could include fewer than or more than 8 phased array antennas without departing from the spirit of the present invention. Additionally, the plurality of phased array antennas are, in a preferred embodiment, arranged linearly, as described above. See e.g., FIG. 3. However, it will also be understood that the arrangement of the phased array antennas could be other than linear. For ease of discussion, the external phase calibration will be described with reference to radar systems, according to the exemplary embodiments described above, that comprise 32 octopods (or radar assemblies) arranged linearly. Fewer than or more than 32 octopods are certainly within the scope of the present invention. See e.g., FIG. 11 (showing 64 octopods). Each octopod, as stated, houses 8 phased array antennas which are likewise arranged linearly. As such, the entire antenna array, in this example, comprises 256 linearly arranged phased array antennas. See e.g., FIG. 9.

The antenna array is positioned above the aforementioned reflector. See e.g., FIGS. 1-5 (reference no. 108). As stated, the one or more calibration antennas are embedded on the surface of the reflector. While the present invention contemplates more than one calibration antenna embedded on the reflector, the exact number of calibration antennas may vary according to exemplary embodiments of the present invention, and this includes only one calibration antenna. It will be understood that using more than one calibration antenna provides independent measurements and results in higher fidelity calibration. For ease of discussion, the external phase calibration will be described with reference to 5 embedded calibration antennas. In a preferred embodiment, the calibration antennas are positioned in a single, linear arrangement dispersed as far apart from each other as possible, but generally distributed evenly relative to the phased array antennas located above the reflector. In other embodiments, the calibration antennas may be arranged along a first, a second or more linear paths. In still other embodiments, the calibration antennas maybe dispersed in a non-linear arrangement. One skilled in the art will appreciate that dispersing the calibration antennas out as much as possible and evenly with respect to the phased array antennas will improve the accuracy of the calibration process, and arranging the calibration antennas linearly simplifies some of the calculations needed for the calibration, in particular, the calculation of the free space constants, which will be discussed below.

The external phase calibration 3400 will now be described with respect to FIG. 34. According to step 3401, each of a plurality of phased array antennas N transmit (tx) a signal, where N equals 256. As explained above, reference to 256 phased array antennas is for ease of discussion, more than or less than 256 is within the scope of the invention. The 256 phased array antennas are housed in 32 radar assemblies or octopods. The phase of each transmit signal ($\phi_{tx}$) is measured at each of M calibration antennas. For ease of discussion, M equals 5. As such, the result is an M×N (M=5, N=256) array of transmit phase ($^{n,m}\phi_{tx}$) measurements, where the superscript n,m represents that the transmit signal is from one of the phased array antennas n, to one of the calibration antennas m.

According to step 3403, a process similar to that described above is performed in the other direction. That is, each of the plurality of phased array antennas N receive (rx) a signal transmitted from each of the M calibration antennas. The phase of each of these receive signals ($\phi_{rx}$) is also measured. The result is an M×N array of receive ($^{n,m}\phi_{rx}$) phase measurements, where the superscript m,n represents that the transmit signal is from one of the calibration antennas m, to one of the phased array antennas n.

Figure 34:
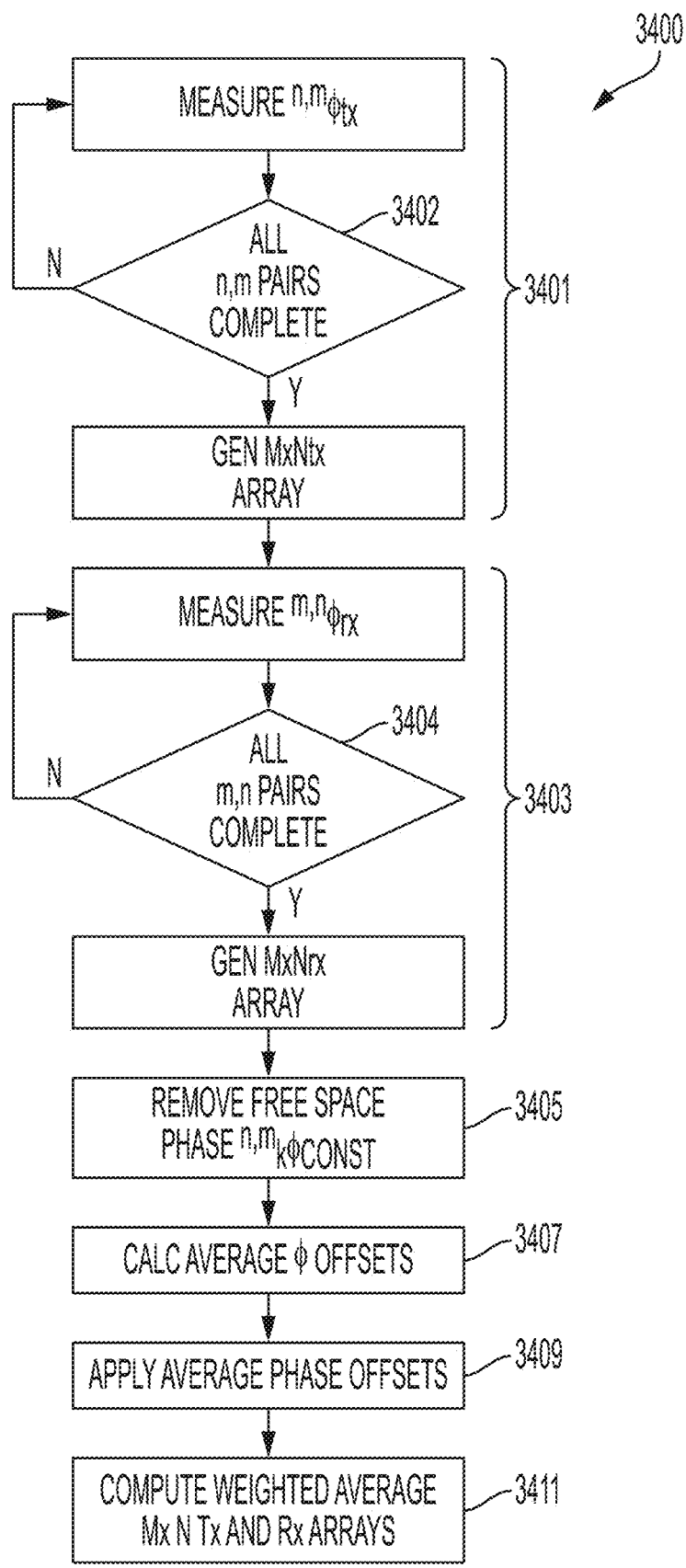
FIG. 34 is a flowchart for external radar calibration according to exemplary embodiments of this disclosure.
Figure 35:
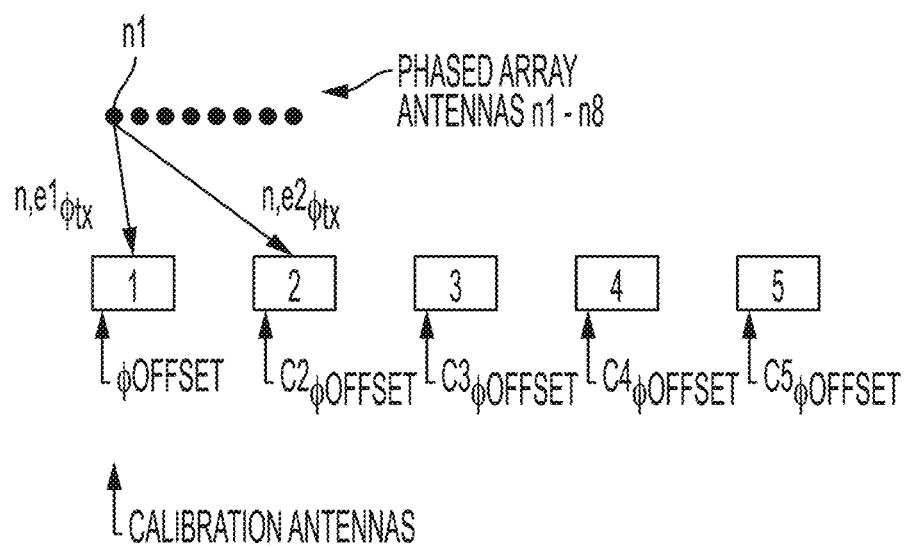
FIG. 35 is a diagram illustrating an exemplary of radar assemblies and phased array antennas for calculating relative phase offset.

It should be noted that in accordance with a preferred embodiment, the transmit phase measurement for each phased array antenna-calibration antenna pair ($^{n,m}\phi_{tx}$) is performed separately, as illustrated by decision block 3402 in FIG. 34. Similarly, the receive phase measurement for each calibration antenna-phased array antenna pair ($^{m,n}\phi_{rx}$) is performed separately, as illustrated by decision block 3404 in FIG. 34. However, in other embodiments, the transmit phase measurements may be performed simultaneously, in whole or in part, and the receive measurements may be performed simultaneously, in whole or in part.

The next step of the external phase calibration involves a free-space phase $_k\phi_{const}$ between each phased array antenna-calibration antenna pair (n,m). The free-space phase $^{n,m}{}_k\phi_{const}$ of a given phased array antenna-calibration antenna pair (n,m) is a function of the distance D between the phased array antenna and the calibration antenna pair of that pair. Those skilled in the art will appreciate that the free-space phase $^{n,m}{}_k\phi_{const}$ for each phased array antenna-calibration antenna pair (n,m) can be measured in advance, and as mentioned above, the linear arrangement of the calibration antennas simplifies these measurements.

According to step 34 of FIG. 34, the free-space phase $^{n,m}{}_k\phi_{const}$ for each phased array antenna-calibration antenna pair (n,m) is subtracted from the measured transmit phase ($^{n,m}\phi_{tx}$) corresponding to that phased array antenna-calibration antenna pair (n,m). The result is an M×N array of phase values ($^{n,m}\phi_{tx} - {}^{n,m}{}_k\phi_{const}$). Likewise, the free-space phase $^{n,m}{}_k\phi_{const}$ for each phased array antenna-calibration antenna pair (n,m) is subtracted from the measured receive phase ($^{n,m}\phi_{rx}$) corresponding to that phased array antenna-calibration antenna pair (n,m). The result is an M×N array of phase values ($^{n,m}\phi_{rx} - {}^{n,m}{}_k\phi_{const}$).

Step 3407 involves weighting factors which are, in a preferred embodiment, pre-calculated for each phased array antenna-calibration antenna pair (n,m). The weighting factor $^{n,m}W$ for a given one of the phased array antenna-calibration antenna pairs (n,m) is a function of the distance D between the phased array antenna and the calibration antenna of that pair. In a preferred embodiment, the weighting factor $^{n,m}W$ for phased array antenna n and calibration antenna m is $1/D^2$, where D is, as stated, the physical distance between phased array antenna n and calibration antenna m. One skilled in the art will appreciate that if there is only one calibration antenna, there is phase offset due to the position of the phased array antennas relative to the one calibration antenna is considered negligible.

In step 3407, an average phase offset is established for each calibration antenna, wherein a first one of the calibration antennas is used as a reference, and is assigned an average phase offset of zero. See FIG. 35. The average phase offset for all other calibration antennas is relative to the first calibration antenna. For example, in the case where there are 5 calibration antennas, step 3407 will involve calculating 4 average phase offsets, where the first calibration antenna, preferably located on the end relative to the other calibration antennas, will have a zero average phase offset, as stated above. The second calibration antenna will have an average phase offset that is relative to the average phase offset of the first calibration antenna. The third calibration antenna will have an average phase offset that is relative to the second calibration antenna, and so on. Calculation of the average phase offset for the first and second calibration antennas will now be described in more detail, with the understanding that the calculation of the average phase offset for the second and the third calibration antennas, the calculation of the average phase offset for the third and the fourth calibration antennas, and the calculation of the average phase offset for the fourth and the fifth calibration antennas will all proceed in a like manner.

For each pair of adjacent calibration antennas, it is necessary to identify a number of phased array antennas having the smallest difference in weighting factor with respect to the first calibration antenna and the second calibration antenna of the two adjacent calibration antennas. By this it is meant that the difference between (subtraction of) the weighting factor of a given phased array antenna and the first calibration antenna and the weighting factor of that same phased array antenna and the second calibration antenna is smaller compare to other phased array antennas. In the preferred embodiment, 8 phased array antennas having the smallest difference in weighting factor with respect to the first calibration antenna and the second calibration antenna are identified. See FIG. 35 (reference nos. n1 to n8). Typically, this will result in the phased array antennas that are closest in proximity to both the first and the second calibration antennas of the pair. For each of the 8 phased array antennas n1 to n8, a transmission phase is measured at both the first calibration antenna and the second calibration antenna. Thus for each of the 8 phased array antennas, there will be a measured transmission phase for the first calibration antenna $^{n,c1}\phi_{tx}$ and a measured transmission phase for the second calibration antenna $^{n,c2}\phi_{tx}$. For each of the phased array antennas, the measured transmission phase for the first calibration antenna and the measured transmission phase for the second antenna are subtracted from one another, resulting in 8 offset phase values. The offset phase for each of the 8 phased array antennas with respect to the first calibration antenna and the second calibration antenna may be represented by $^{n1,c2}\phi_{offset}$, $^{n2,c2}\phi_{offset}$, $^{n3,c2}\phi_{offset}$, $^{n4,c2}\phi_{offset}$, $^{n5,c2}\phi_{offset}$, $^{n6,c2}\phi_{offset}$, $^{n7,c2}\phi_{offset}$, $^{n8,c2}\phi_{offset}$. From these, an average phase offset $^{c2}\approx\phi_{offset}$ for the second calibration antenna, relative to the first calibration antenna can be calculated.

Further in accordance with step 3407, the same procedure is followed for calculating the average phase offset for the other calibration antenna pairs. Thus, in the case of 5 calibration antennas, there will be 4 resulting average phase offsets $^{c2}\phi_{offset}$ (phase offset between the second and the first calibration antennas), $^{c3}\phi_{offset}$ (phase offset between the third and the second antennas), $^{c4}\phi_{offset}$ (phase offset between the fourth and the third calibration antennas), $^{c5}\phi_{offset}$, (phase offset between the fifth and the fourth calibration antennas).

In step 3409 of FIG. 34, one or more of the average phase offsets $0$, $^{c2}\phi_{offset}$, $^{c3}\phi_{offset}$, $^{c4}\phi_{offset}$, $^{c5}\phi_{offset}$, are applied (added) to the measured phase (adjusted for free space phase) for each phased array antenna along a corresponding row M of the M×N transmit array and the M×N receive array. Thus, for example, for each of the N (256) measured phase values of the M×N transmit array ($^{n,m}\phi_{tx}-^{n,m}\phi_{const}$) in row 1 (M=1), zero (0) offset will be added to each measured phase value because there is no offset associated with the first (end) calibration antenna, as explained above. For each of the N (256) measured phase values of the M×N transmit array ($^{n,m}\phi_{tx}-^{n,m}\phi_{const}$) in row 2 (M=2), an offset of $^{c2}\phi_{offset}$ will be added to each measured phase value. For each of the N (256) measured phase values of the M×N transmit array ($^{n,m}\phi_{tx}-^{n,m}\phi_{const}$) in row 3 (M=3), an offset of $^{c2}\phi_{offset}+^{c3}\phi_{offset}$ will be added to each measured phase value. For each of the N (256) measured phase values of the M×N transmit array ($^{n,m}\phi_{tx}-^{n,m}\phi_{const}$) in row 4 (M=4), an offset of $^{c2}\phi_{offset}+^{c3}\phi_{offset}+^{c4}\phi_{offset}$ will be added to each measured phase value. And, for each of the N (256) measured phase values of the M×N transmit array ($^{n,m}\phi_{tx}-^{n,m}\phi_{const}$) in row 5 (M=5), an offset of $^{c2}\phi_{offset}+^{c3}\phi_{offset}+^{c4}\phi_{offset}+^{c5}\phi_{offset}$ will be added to each measured phase value.

Accordingly, the resulting phase values in each row of the M×N transmit array can be represented by the following.

$(^{n,m}\phi_{tx}-^{n,m}\phi_{const}+0)$—where $m=1, n=1$ to 256

$(^{n,m}\phi_{tx}-^{n,m}\phi_{const}+0+^{c2}\phi_{offset})$—where $m=2, n=1$ to 256

$(^{n,m}\phi_{tx}-^{n,m}\phi_{const}+0+^{c2}\phi_{offset}+^{c3}\phi_{offset})$—where $m=3$, $n=1$ to 256

$(^{n,m}\phi_{tx}-^{n,m}\phi_{const}+0+^{c2}\phi_{offset}+^{c3}\phi_{offset}+^{c4}\phi_{offset})$—where $m=4, n=1$ to 256

$(^{n,m}\phi_{tx}-^{n,m}\phi_{const}+0+^{c2}\phi_{offset}+^{c3}\phi_{offset}+^{c4}\phi_{offset}+^{c5}\phi_{offset})$—where $m=5, n=1$ to 256

Further in accordance with step 3409, the average phase offsets $^{c2}\phi_{offset}$, $^{c3}\phi_{offset}$, $^{c4}\phi_{offset}$, $^{c5}\phi_{offset}$ are applied in the same manner to the measured phase (adjusted for free space phase) for each phased array antenna along a corresponding row M of the M×N receive array. Accordingly, the resulting phase values in each row of the M×N receive array can be represented by the following.

$(^{n,m}\phi_{rx}-^{n,m}\phi_{const}+0)$—where $m=1, n=1$ to 256

$(^{n,m}\phi_{rx}-^{n,m}\phi_{const}+0+^{c2}\phi_{offset})$—where $m=2, n=1$ to 256

$(^{n,m}\phi_{rx}-^{n,m}\phi_{const}+0+^{c2}\phi_{offset}+^{c3}\phi_{offset})$—where $m=3$, $n=1$ to 256

$(^{n,m}\phi_{rx}-^{n,m}\phi_{const}+0+^{c2}\phi_{offset}+^{c3}\phi_{offset}+^{c4}\phi_{offset})$—where $m=4, n=1$ to 256

$(^{n,m}\phi_{rx}-^{n,m}\phi_{const}+0+^{c2}\phi_{offset}+^{c3}\phi_{offset}+^{c4}\phi_{offset}+^{c5}\phi_{offset})$—where $m=5, n=1$ to 256

In the last step of FIG. 34, step 3411, a weighted average of the M×N transmit array is calculated over the M axis. This results in a length N vector of phases. These are the resulting transmit phase corrections. A weighted average of the M×N receive array is calculated over the M axis. This results in a length N vector of phases. These are the resulting receive phase corrections. The transmit phase corrections and the receive phase corrections can then be stored and applied to the transmit and receive operations of the radar system, such as the radar systems described above.

Internal Phase Calibration

The internal phase calibration technique is "internal" because it involves transmitting radar signals between a plurality of phased array antennas (often referred to as radar elements) and a field probe located within a radar assembly or octopod, or between one or more phased array antennas and a field probe located in another (e.g., adjacent) radar assembly or octopod. Unlike the external phase calibration embodiments described above, there are no calibration antennas embedded in a far-field reflector. In a preferred embodiment, the internal phase calibration involves two calibration processes, as mentioned above: an inter-radar assembly phase calibration and a channel phase calibration. Both of these internal phase calibration processes will be describe in greater detail herein below.

Figure 36:
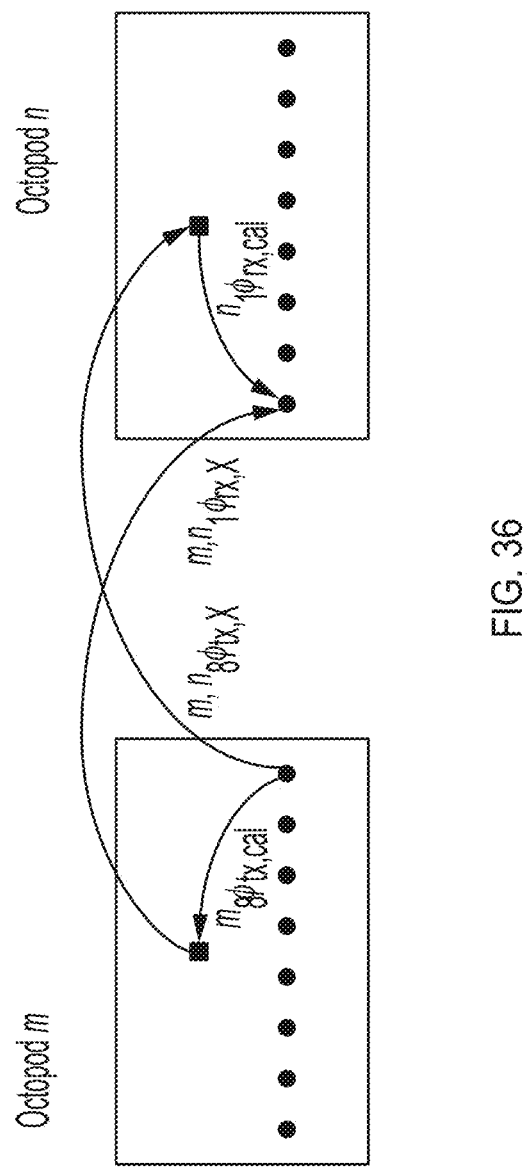
FIG. 36 is a diagram illustrating an exemplary configuration of two neighboring radar assemblies and the signals used in inter-radar assembly phase calibration according to exemplary embodiments of this disclosure.

To assist in the understanding of the internal phase calibration processes, including the inter-radar assembly phase calibration and the channel phase calibration, reference will be made to FIG. 36. In FIG. 36, there are two exemplary radar assemblies. Herein below, the radar assemblies are referred to as octopods, as in the preferred embodiment, each radar assembly comprises 8 phased array antennas, which are represented as circles in FIG. 36, in each of the two octopods m and n. Each octopod also comprises a field probe, which is represented as a square in each of octopods m and n. In at least one exemplary embodiment, the phased array antennas are patch antennas, as illustrated in FIG. 8. However, as one skilled in the art will readily appreciate, the phased array antennas could be a different type antenna. As for the field probe, one skilled in the art will appreciate that it could be a prick antenna, a patch antenna, a dipole antenna or the like. Thus, the present invention is not limited to specific types of antennas.

In addition, for ease of discussion, and to be consistent with the external phase calibration described above, the internal phase calibration will be described with respect to 32 octopods, and thus, a total of 256 linearly arranged phased array antennas.

Internal Channel Phase Calibration

Figure 37:
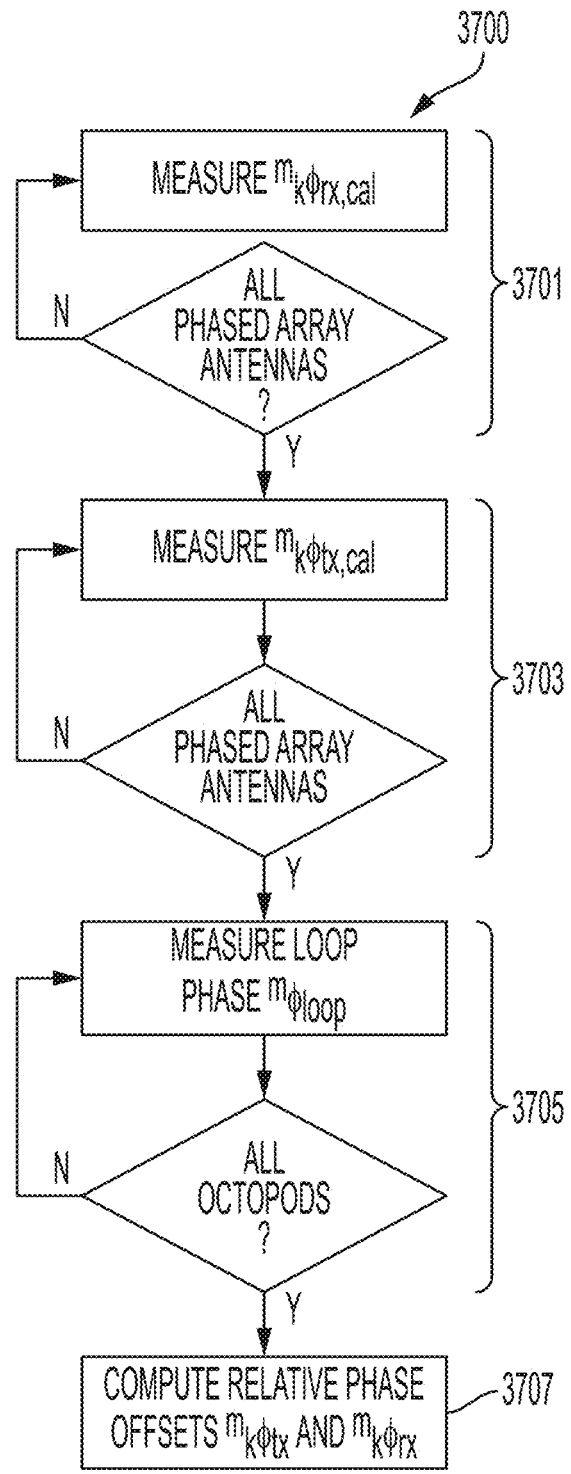
FIG. 37 is a flowchart for internal channel phase calibration according to exemplary embodiments of this disclosure.

FIG. 37 is a flow diagram illustrating the internal channel phase calibration 3700, in accordance with a preferred embodiment. As shown, in step 3701, the field probe in a first octopod, for example octopod n in FIG. 36, transmits a signal to and is received by each of the phased array antennas in octopod n. The phase of the signal received at each of the phased array antennas is measured. As an example, the phase measured at the first (left-most) phased array antenna in octopod n can be represented as $^n_1\varnothing_{rx,cal}$, where "n" indicates octopod n, "1" indicates the first (left-most) phased array antenna in octopod n, "rx" indicates the phase is associated with the signal received at the phased array antenna, and "cal" indicates that the phase is associated with channel phase calibration. Further in accordance with step 3701, this same process is repeated for all of the phased array antennas, which involves 256 in the example of the preferred embodiment. Thus the result is 256 receive phase measurements represented by $^m_k\varnothing_{rx,cal}$, where "m" in this instance generally represents the octopod number and "k" generally represents the phased array antenna in octopod m.

In step 3703, a reverse process takes place. That is, each phased array antenna in each octopod transmits a signal to the field probe. For example, in FIG. 36, the eighth (right-most) phased array antenna in octopod m transmits a signal to and is received by the field probe in octopod m. The phase of the signal received at the field probe is measured. As an example, the phase measured at the field probe due to the signal transmitted by the eighth (right-most) phased array antenna in octopod m can be represented as $^m_8\varnothing_{tx,cal}$, where "m" indicates octopod m, "8" indicates the eighth (right-most) phased array antenna in octopod m, "tx" indicates the phase is associated with the signal transmitted by the phased array antenna, and "cal" indicates that the phase is associated with channel phase calibration. Further in accordance with step 3703, this same process is repeated for all of the phased array antennas, which is 256 in the example of the preferred embodiment. Thus the result is 256 transmit phase measurements represented by $^m_k\varnothing_{tx,cal}$.

At this point it is noted that the transmit and receive phase measurements ($^m_k\varnothing_{tx,cal}$ and $^m_k\varnothing_{rx,cal}$) reflect the phase contributions of the entire system. So, for example, the phase measurements associated with a given one of the octopods reflect the phase contributions from the electronics in that octopod as well as the cables that connect that octopod to the corresponding transmitter and receiver hardware. The phase measurements also reflect the free-space phase attributed to the physical space between a corresponding phased array antenna-calibration antenna pair.

In step 3705 of FIG. 37, an internal loop back phase measurement $^m\varnothing_{loop}$ is taken for each octopod. As one skilled in the art will appreciate, the loop back phase measurement reflects the phase contribution due to the transmitted signal that travels from the transmitter through the cables to the octopod and then back through return cables to the receiver, but bypassing the antennas in the octopod. It is necessary to measure the loop back phase for each octopod at the time of the channel phase calibration because the loop back phase measurements can vary significantly over time, particularly due to changes in temperature.

Then, in step 3707, the transmit phase offset for each phased array antenna is computed and the receive phase offset for each phase array antenna is computed. These transmit and receive phase offsets can be represented as follows.

$$^m_k\varnothing_{tx} = -[(^m_k\varnothing_{tx,cal} - ^m\varnothing_{loop}) + (^m\varnothing_K - {}_k\varnothing_{const})]$$

$$^m_k\varnothing_{rx} = -[(^m_k\varnothing_{rx,cal} - ^m\varnothing_{loop}) + (^m\varnothing_K - {}_k\varnothing_{const})]$$

In the channel phase offset representations above, $^m_k\varnothing_{tx}$ and $^m_k\varnothing_{rx}$ represent the channel phase corrections that are to be used during radar transmit and receive operations, respectively, for each phased array antenna k in octopod m. Further, $^m_k\varnothing_{tx,cal}$ and $^m_k\varnothing_{rx,cal}$ represent the measured phase values, which are the result of step V103 described above; $^m\varnothing_{loop}$ is the internal loop back phase for octopod m as measured in step V105 described above; and $_k\varnothing_{const}$ is the free-space phase calculated for phased array antenna k in octopod m. As explained for the external calibration, free-space phase is a function of the physical distance between antenna k and the calibration antenna in octopod m. Lastly, $^m\varnothing_K$ represents other phases that are constant with respect to octopod m, and these are pre-measured in a lab environment, as those skilled in the art will appreciate. These constants may include, for example, the internal phase between the transmit cables connecting the transmitter to the octopod and the receive cables connecting the octopod to the receiver. These constants may also include, for example, the internal phase contribution due to a transmitted signal from the input of the octopod to the field probe and the receive signal from the field to the output of the octopod. Again, those skilled in the art will understand and appreciate these constant values that are all pre-measured in the lab and considered in calculating the transmit and receive phase offsets $^m_k\varnothing_{tx}$ and $^m_k\varnothing_{rx}$ as illustrated above.

Internal Inter-Octopod Phase Calibration

In addition to calculating and applying the transmit and receive channel phase offsets $^m_k\varnothing_{tx}$ and $^m_k\varnothing_{rx}$ to the radar transmit and receive operations, as described above, in a preferred embodiment, inter-octopod transmit phase offsets $^m\theta_{tx}$ and inter-octopod receive phase offsets $^m\theta_{rx}$ are also calculated for each octopod m and added to the transmit and receive channel phase offsets $^m_k\varnothing_{tx}$ and $^m_k\varnothing_{rx}$ associated with octopod m. The addition of the transmit and receive channel phase offsets $^m_k\varnothing_{tx}$ and $^m_k\varnothing_{rx}$ and the transmit and receive inter-octopod phase offsets $^m\theta_{tx}$ and $^m\theta_{rx}$ result in a total internal transmit phase offset $^m_k\Theta_{tx}$ for each channel (i.e., each phased array antenna channel) and a total internal receive phase offset $^m_k\Theta_{rx}$ for each channel. Thus, the total internal transmit and receive phase offsets $^m_k\Theta_{tx}$ and $^m_k\Theta_{rx}$ reflect both channel phase offset and inter-octopod offset, and they are generally represented as follows.

$$^m_k\Theta_{tx} = {}^m\theta_{tx} + {}^m_k\varnothing_{tx}$$

$$^m_k\Theta_{rx} = {}^m\theta_{rx} + {}^m_k\varnothing_{rx}$$

Figure 38A:
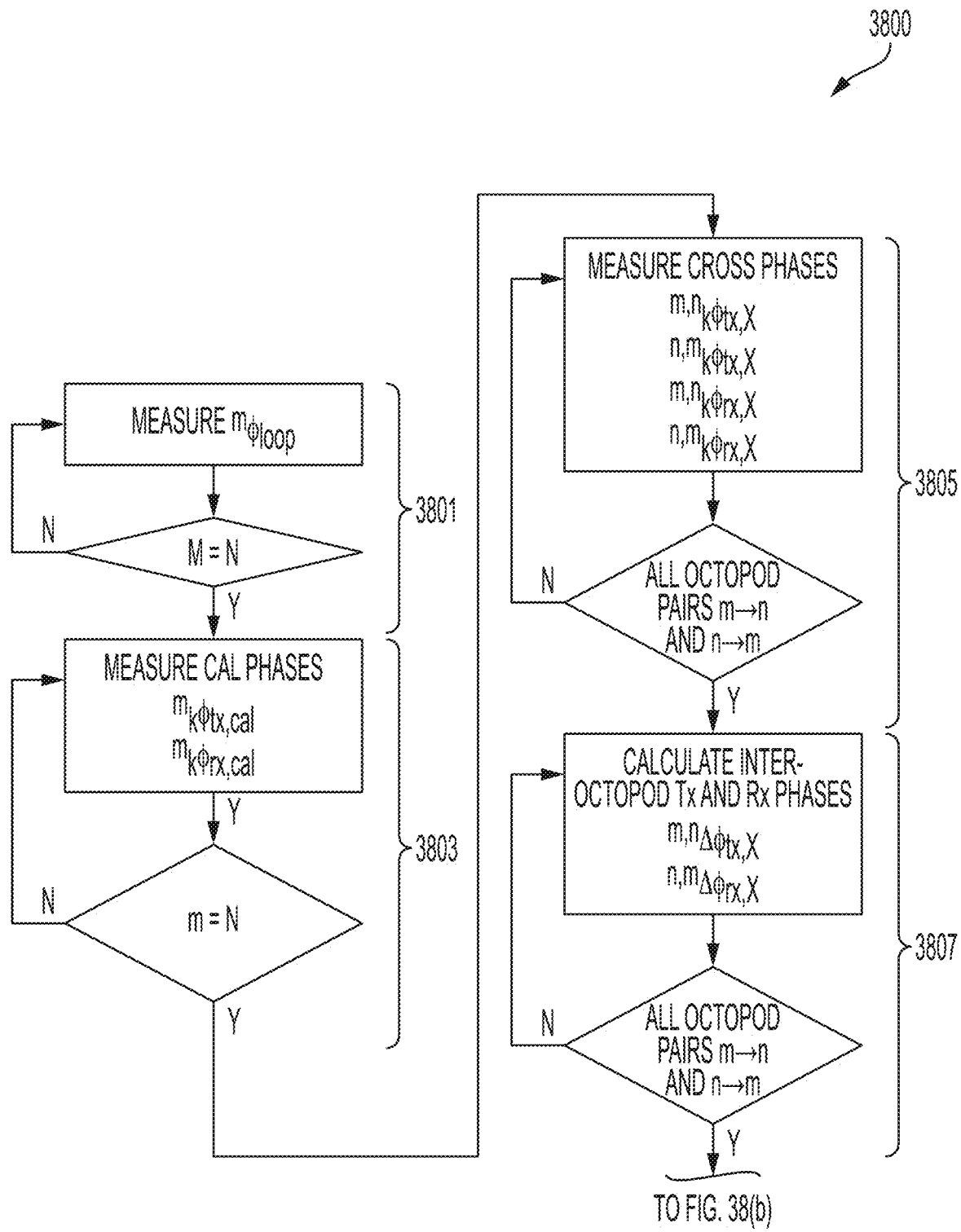
FIG. 38 is a flowchart for calculating transmit and receive inter-radar assembly phase offsets according to exemplary embodiments of this disclosure.
Figure 38B:
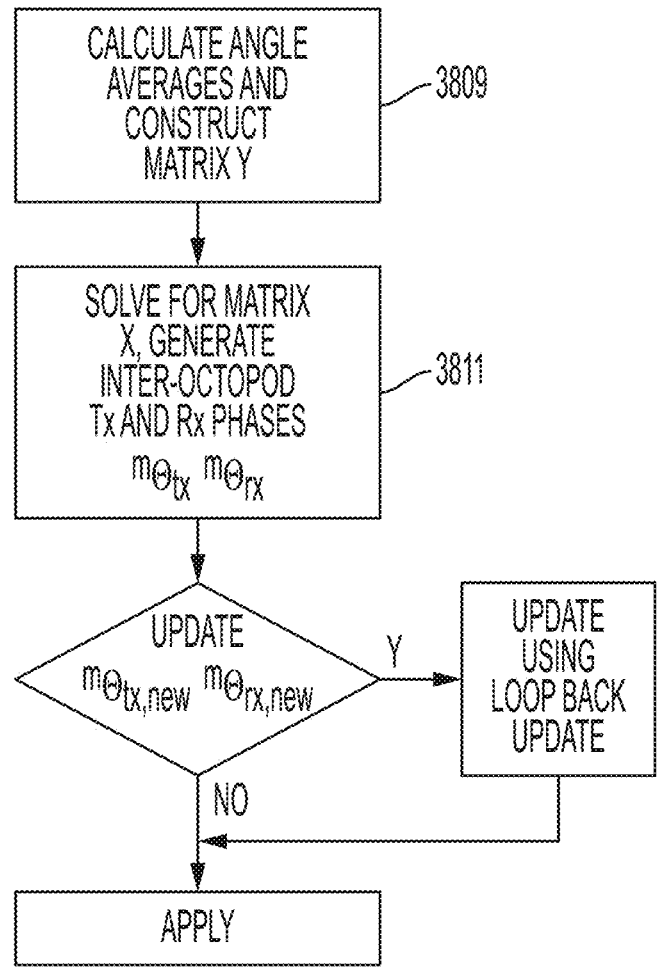

FIG. 38 is a flowchart illustrating a method 3800 for calculating the transmit and receive inter-octopod phase offsets. According to step 3801, the loop back phase $^m\varnothing_{loop}$ is measured for each octopod. Loop back phase was described above, and is well-known in the art. As mentioned, for ease of discussion, there are 32 octopods, therefore, step 3801 results in 32 loop back phase measurements $^1\varnothing_{loop}$ to $^{32}\varnothing_{loop}$.

Figure 39A:
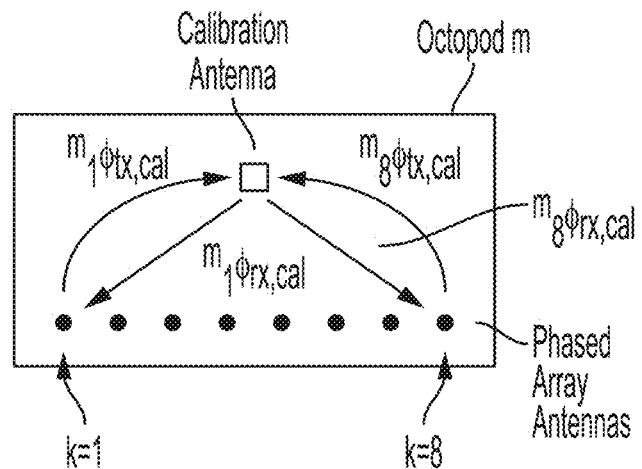
FIG. 39 is a diagram illustrating the signals used in calculating transmit and receive cross phase measurements according to exemplary embodiments of this disclosure.

In step 3803, for each octopod m, a transmit cal phase $^m{}_k\phi_{tx,cal}$ is measured at the field probe for a signal transmitted by the first phased array antenna (k=1) and a signal transmitted by the eighth phased array antenna (k=8) in the octopod. The transmit cal phases are represented as $^m{}_1\phi_{tx,cal}$ and $^m{}_8\phi_{tx,cal}$, respectively. In addition, a receive cal phase $^m{}_k\phi_{rx,cal}$ is measured at each of the first and eighth phased array antennas in the octopod for a signal transmitted by the field probe in the octopod. The receive cal phases are represented as $^m{}_1\phi_{rx,cal}$ and $^m{}_8\phi_{rx,cal}$, respectively. These cal phase measurements are illustrated in FIG. 39(a).

Figure 39B:
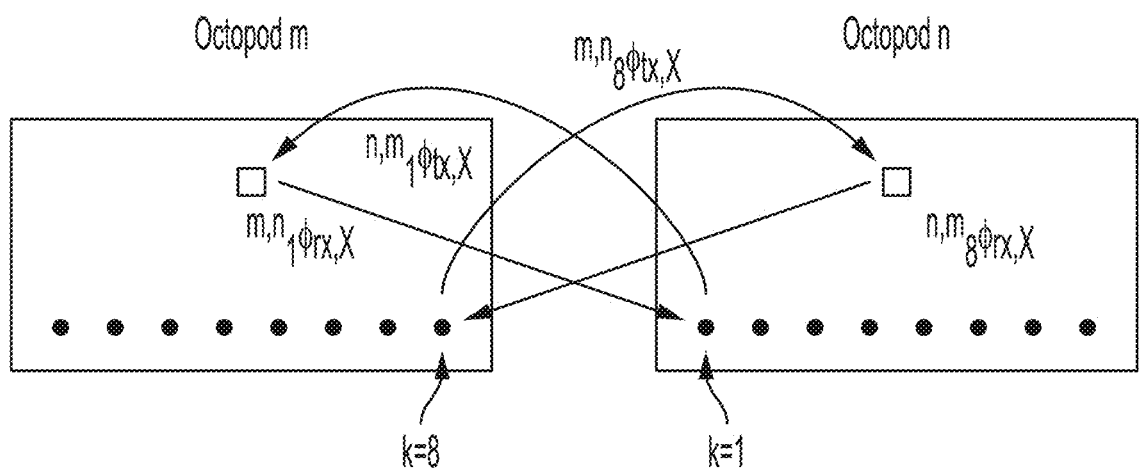

In step 3805 of FIG. 38, for each adjacent octopod pair, for example, octopod pair m-n, as illustrated in FIG. 39(b), a number of cross phases are measured. A cross phase is measured at the field probe in octopod n, as represented by $^{m,n}{}_8\phi_{tx,cal}$, where m,n and 8 indicate that the signal is transmitted from phased array antenna 8 of octopod m to the field probe in octopod n. A cross phase is measured at phased array antenna 1 of octopod n, as represented by $^{m,n}{}_1\phi_{rx,cal}$, where n,m and 1 indicate that the signal is transmitted from the field probe in octopod m to phased array antenna 1 in octopod n. A cross phase is measured at the field probe in octopod m, as represented by $^{n,m}{}_1\phi_{tx,cal}$, where n,m and 1 indicate that the signal is transmitted from phased array antenna 1 of octopod n to the field probe in octopod m. And finally, a cross phase is measured at phased array antenna 8 of octopod m, as represented by $^{m,n}{}_8\phi_{rx,cal}$, where n,m and 8 indicate that the signal is transmitted from the field probe in octopod n to phased array antenna 8 in octopod m. Thus, for each pair of adjacent octopods, for example, octopod pair m-n, there are two cross phase measurements measured in octopod n and there are two cross phase measurements measured in octopod m.

In step 3807, an inter-octopod transmit phase for each octopod pair m-n and n-m, as represented by $^{m,n}\Delta\phi_{tx}x$, is calculated as a function of the loop back phase measurements (step 3801), the transmit cal phase measurements (step 3803), the cross phase measurements (step 3805), and a number of other phases that are constant with respect to each octopod, as explained above in the description of the channel phase calibration. Likewise, in step 3807, an inter-octopod receive phase for each octopod pair m-n and n-m, as represented by $^{m,n}\Delta\phi_{rx}x$, is calculated in a similar manner. In a preferred embodiment, the inter-octopod transmit and receive phases $^{m,n}\Delta\phi_{tx}x$ and $^{m,n}\Delta\phi_{rx}x$ for each octopod pair can be represented as follows.

$$^{m,n}\Delta\phi_{tx}x = (^{m,n}{}_k\phi_{tx}x - ^m{}_k\phi_{tx,cal}) + (^m\phi_{loop} - ^{N/2}\phi_{loop}) + (^m\phi_K - _k\phi_{const})$$

$$^{m,n}\Delta\phi_{rx}x = (^{m,n}{}_k\phi_{tx}x - ^m{}_k\phi_{rx,cal}) + (^m\phi_{loop} - ^{N/2}\phi_{loop}) + (^m\phi_K - _k\phi_{const})$$

It is important to note, in the equations above, for inter-octopod transmit and receive phases, the loop back phase contribution is given by $^m\phi_{loop} - ^{N/2}\phi_{loop}$, where $^{N/2}\phi_{loop}$ represents a reference loop back phase measurement at a reference octopod r which, in a preferred embodiment is the octopod physically located in the middle of the linearly aligned octopods. As there are N octopods, the reference octopod r physically located in the middle of the N octopods is octopod N/2, that is, r=N/2. In alternative embodiments, a different one of the N octopods could be used.

It is also important to note that in a preferred embodiment, the phased array antennas on each end of every octopod, i.e., phased array antenna 1 (k=1) and phased array antenna 8 (k=8) are used to transmit and receive the signals needed to measure the cal phases, described in step 3803, and used to transmit and receive the signals needed to measure the cross phases, as described in step 3805. However, it is certainly possible, in accordance with alternative embodiments, and within the scope of the present invention to use antennas other than phased array antenna 1 and phased array antenna 8. In still other embodiments, the field probes in each octopod can be used to transmit and receive signals from the field probes in adjacent octopods to measure cross phase, thus omitting the use of the phased array antennas.

In step 3809 of FIG. 38, the inter-octopod transmit phase values and the inter-octopod receive phase values are used to calculate an angle average for each pair of adjacent octopods m-n and n-m. The following equation is used, in a preferred embodiment for calculating the angle averages.

$$^{m,n}\Delta\phi x = \angle [\exp(i \cdot ^{m,n}\Delta\phi x_{rx}x) + \exp(i \cdot ^{m,n}\Delta\phi x_{tx}x)]$$

The result of calculating the angle average for each pair of adjacent octopod pairs is a 1-dimensional matrix y containing 2(N−1) angle averages—one for each pair of N−1 adjacent octopods m-n and one for each pair of N−1 adjacent octopods n-m. Again, N is the number of octopods. And, for ease of discussion, in our exemplary embodiment, N=32. In this example, the y matrix will have 62 angle averages, and it may be represented as follows.

$$y = \begin{bmatrix} ^{1,2}\Delta\phi_X \\ ^{2,3}\Delta\phi_X \\ \vdots \\ ^{N-1,N}\Delta\phi_X \\ ^{2,1}\Delta\phi_X \\ ^{3,2}\Delta\phi_X \\ \vdots \\ ^{N,N-1}\Delta\phi_X \end{bmatrix}$$

In step 3811 of FIG. 38, the inter-octopod transmit phases $^m\phi_{tx}$ and the inter-octopod receive phases $^m\phi_{rx}$ are calculated. Again, if the number of octopods N is 32, m will range from 1-32. Thus, in calculating the inter-octopod transmit phases $^m\phi_{tx}$ and the inter-octopod receive phases $^m\phi_{rx}$, the end result will be 2N inter-octopod phase values, that is, 32 transmit phase values and 32 receive phase values for each of the N octopods. The 32 transmit phase values and 32 receive phase values can be represented by a matrix x, as shown herein below.

$$x = \begin{bmatrix} ^1\phi_{tx,com} - ^r\phi_{tx,com} \ x \\ ^2\phi_{tx,com} - ^r\phi_{tx,com} \\ \vdots \\ ^N\phi_{tx,com} - ^r\phi_{tx,com} \\ ^1\phi_{rx,com} - ^r\phi_{rx,com} \\ ^2\phi_{rx,com} - ^r\phi_{rx,com} \\ \vdots \\ ^N\phi_{rx,com} - ^r\phi_{rx,com} \end{bmatrix}$$

In matrix x above, the elements represent either an inter-octopod transmit phase offset $^m\theta_{tx}$ or an inter-octopod receive phase offset $^m\theta_{rx}$ for each of the octopods N, where m=1 to N, where $^m\theta_{tx} = ^r\phi_{tx,com} - ^r\phi_{tx,com}$ and where $^m\theta_{rx} = ^r\phi_{rx,com} - ^r\phi_{rx,com}$. Further, the inter-octopod transmit phase offsets $^m\theta_{tx}$ and the inter-octopod receive phase offsets $^m\theta_{rx}$ are, as shown, calculated relative to the reference octopod r. As mentioned above, the reference octopod r is, in a preferred embodiment, the octopod physically located in the middle of the N octopods. Thus, the reference octopod r is octopod N/2. Those skilled in the art will understand that by calculating the inter-octopod phases relative to a single octopod, and in particular, reference octopod r (N/2), the computations are simplified. As stated, however, an octopod other than octopod N/2 is within the scope of the present invention.

In view of the explanation above, the matrix can be written out as: $x = (^1\theta_{tx}, ^2\theta_{tx} \ldots ^N\theta_{tx}, ^1\theta_{rx}, ^2\theta_{rx} \ldots ^N\theta_{rx})$, where $^m\theta_{tx} = {^m\phi_{tx,com}} - {^r\phi_{tx,com}}$ and where $^m\theta_{rx} = {^m\phi_{rx,com}} - {^r\phi_{rx,com}}$.

The relationship between matrix y, calculated above in step 3809, and matrix x can be given as follows, $$y = Ax$$

where A is a solver matrix having a dimension $(2(N-1)) \times (2(N-1))$. Using well-known linear algebra techniques, one of skilled in the art can solve the matrix x above, resulting in N inter-octopod transmit phases, $^1\theta_{tx}, ^2\theta_{tx} \ldots ^N\theta_{tx}$, and N inter-octopod receive, $^1\theta_{rx}, ^2\theta_{rx} \ldots ^N\theta_{rx}$. These phase values can then be used to calculate what we referred to above as the total internal transmit phase offsets $^m_k\Theta_{tx}$ and the total internal receive offsets $^m_k\Theta_{rx}$, as repeated below.

$$^m_k\Theta_{tx} = {^m\theta_{tx}} + {^m_k\phi_{tx}}$$

$$^m_k\Theta_{rx} = {^m\theta_{rx}} + {^m_k\phi_{rx}}$$

If there are, as in this example, 32 octopods, each comprising 8 phased array antennas, the above calculation will result in 256 total internal transmit phase offsets $^m_k\Theta_{tx}$, where k=1 to 256, and there will be 256 total internal receive phase offsets $^m_k\Theta_{rx}$, again, where k=1 to 256. These internal phase offsets can then be applied to the transmit and receive radar operations to improve the accuracy of the radar system.

In the preferred embodiment described above, the inter-octopod phase calibration is based on the phased array antennas in each octopod and the octopods themselves being aligned in a linear configuration. The inter-octopod phase calibration is also based on measuring the cross phases for adjacent octopods. This allows us to solve the matrix x above using well-known linear methods, as stated. Nevertheless, it is within the scope of the present invention to configure the octopods in an arrangement that is non-linear. It is also within the scope of the present invention to measure the cross phases for non-adjacent octopods; however, solving for the inter-octopod transmit phase $^m\theta_{tx}$ and the inter-octopod receive phase $^m\theta_{rx}$ in matrix x would require the use of non-linear methods, which is more complex, but well-known.

As stated previously, one particular phase contribution can vary significantly over time, mostly due to changes in temperature. The particular phase contribution is the loop back phase $^m\phi_{loop}$. In accordance with a preferred embodiment of the present invention, the internal calibration is updated using more frequently updated loop back phase measurements. Thus, if inter-octopod transmit and receive phase values previously calculated are represented by $^m\theta_{tx,old}$ and $^m\theta_{rx,old}$, periodically updated inter-octopod transmit and receive phase values, represented as $^m\theta_{tx,new}$ and $^m\theta_{rx,new}$, can be calculated, based on updated loop back phase measurements $^m\phi_{loop,new}$. In a preferred embodiment, periodically updated inter-octopod transmit and receive phase values $^m\theta_{tx,new}$ and $^m\theta_{rx,new}$ can be calculated as follows, although other calculations are within the scope of the present invention.

$$^m\theta_{tx,new} = {^m\theta_{tx,old}} - \tfrac{1}{2}({^m\phi_{loop,new}} - {^m\phi_{loop,old}}) + \tfrac{1}{2}({^r\phi_{loop,new}} - {^r\phi_{loop,old}})$$

$$^m\theta_{rx,new} = {^m\theta_{rx,old}} - \tfrac{1}{2}({^m\phi_{loop,new}} - {^m\phi_{loop,old}}) + \tfrac{1}{2}({^r\phi_{loop,new}} - {^r\phi_{loop,old}})$$

In the equations above, the periodically updated inter-octopod transmit and receive phase values, $^m\theta_{tx,new}$ and $^m\theta_{rx,new}$, are based on updated loop back phase values at each octopod N relative to the reference octopod r. Again, the updated inter-octopod transmit and receive phase values $^m\theta_{tx,new}$ and $^m\theta_{rx,new}$ would be applied to the transmit and receive radar operations, in the same manner as described above, at least an until a completely new internal calibration is performed involving both channel phase calibration and inter-octopod phase calibration. The periodic update of inter-octopod transmit and receive phase values $^m\theta_{tx,new}$ and $^m\theta_{rx,new}$ is illustrated in step 3813 of FIG. 38.

Various corresponding structures, materials, acts, and equivalents of all means or step plus function elements in various claims below are intended to include any structure, material, or act for performing the function in combination with other claimed elements as specifically claimed. Various embodiments were chosen and described in order to best explain various principles of this disclosure and various practical applications thereof, and to enable others of ordinary skill in a pertinent art to understand this disclosure for various embodiments with various modifications as are suited to a particular use contemplated.

This detailed description has been presented for various purposes of illustration and description, but is not intended to be fully exhaustive and/or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

The invention claimed is:

1. A radar calibration method comprising:
 transmitting a signal from each of a plurality of phased array antennas and measuring a transmission phase for each transmitted signal as it is received at one or more calibration antennas, wherein one transmission phase is measured for each phased array antenna-calibration antenna combination;
 receiving, from each of the one or more calibration antennas, a signal at each of the plurality of phased array antennas, and measuring a receive phase for each received signal at each of the plurality of phased array antennas, wherein one receive phase is measured for each phased array antenna-calibration antenna combination;
 adjusting each measured transmission phase and each measured receive phase by a phase offset associated with a corresponding one of the one or more calibration antennas, where the phase offset associated with each one of the one or more calibration antennas is greater than or equal to zero;
 calculating a single transmission phase correction for each of the plurality of phased array antennas, wherein the single transmission phase correction for a given one of the phased array antennas is based on a weighted average of the offset adjusted, measured transmission phases associated with the given one of the phased array antennas and the one or more calibration antennas;

calculating a single receive phase correction for each of the plurality of phased array antennas, wherein the single receive phase correction for a given one of the phased array antennas is based on a weighted average of the offset adjusted, measured receive phases associated with the given one of the phased array antennas and the one or more calibration antennas; and storing the single transmission phase correction for each of the plurality of phased array antennas and the single receive phase correction for each of the plurality of phased array antennas for adjusting the phase of the plurality of phased array antennas during radar operations.

2. The method of claim 1 further comprising:
measuring a free-space phase offset for each phased array antenna-calibration antenna pair; and
further adjusting the measured transmission phase for each phased array antenna-calibration antenna pair and adjusting the measured receive phase for each phased array antenna-calibration antenna pair by the free-space offset measured for the corresponding phased array antenna-calibration antenna pair.

3. The method of claim 1, wherein the plurality of phased array antennas are linearly aligned relative to each other.

4. The method of claim 3, wherein the one or more calibration antennas are embedded on a surface of a radar reflector.

5. The method of claim 4, wherein the number of calibration antennas is greater than 1, and wherein the calibration antennas are spaced apart from the plurality of phased array antennas.

6. The method of claim 5, wherein the calibration antennas are linearly aligned and evenly dispersed relative to the plurality of phased array antennas.

7. The method of claim 6, wherein the phase offset associated with each of the calibration antennas, other than a first one of the calibration antennas, is calculated relative to the phase offset of the first one of the calibration antennas and any calibration antennas located between that calibration antenna and the first calibration antenna.

8. The method of claim 7, wherein the phase offset of the first one of the calibration antennas is zero.

9. The method of claim 7, wherein calculating the phase offset of a given one of the calibration antennas, other than the first one of the calibration antennas comprises:
identifying a subset of the plurality of phased array antennas based on weighting factors associated with each of the phased array antennas in the subset, the given calibration antenna and the first calibration antenna or another calibration antenna adjacent to and between the given calibration antenna and the first calibration antenna;
transmit a signal from each of the phased array antennas in the subset, and measure a transmit phase at the given calibration antenna and the first or adjacent calibration antenna, and calculate a transmit phase difference value for each of the phased array antennas in the subset by subtracting the corresponding transmit phase measured at the given calibration antenna and the corresponding transmit phase measured at the first or adjacent calibration antenna; and
calculate a phase offset for the given calibration antenna based on a weighted average of the transmit phase difference values associated with the phased array antennas in the subset.

10. The method of claim 8, wherein adjusting each measured transmission phase and each measured receive phase by a phase offset associated with a corresponding one of the calibration antennas comprises:
adding to each measured transmission phase and each measured receive phase the calculated phase offset of the corresponding one of the calibration antennas plus the calculated phase offset of any and all calibration antennas located between the corresponding one of the calibration antennas and the first calibration antenna.

* * * * *